United States Patent
Nagata

(10) Patent No.: US 8,239,346 B2
(45) Date of Patent: Aug. 7, 2012

(54) STORAGE SYSTEM AND ITS FILE MANAGEMENT METHOD

(75) Inventor: Yuki Nagata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 306 days.

(21) Appl. No.: 12/663,789

(22) PCT Filed: Nov. 5, 2009

(86) PCT No.: PCT/JP2009/005874
§ 371 (c)(1),
(2), (4) Date: Dec. 9, 2009

(87) PCT Pub. No.: WO2011/055409
PCT Pub. Date: May 12, 2011

(65) Prior Publication Data
US 2011/0191298 A1   Aug. 4, 2011

(51) Int. Cl.
*G06F 17/30* (2006.01)
(52) U.S. Cl. ....................................................... 707/638
(58) Field of Classification Search .................. 707/609, 707/638, 640, 644, 650, 652, 661, 821, 822, 707/825
See application file for complete search history.

(56) References Cited

U.S. PATENT DOCUMENTS

| | | | | |
|---|---|---|---|---|
| 6,460,055 B1* | 10/2002 | Midgley et al. | ............... | 707/640 |
| 6,526,418 B1* | 2/2003 | Midgley et al. | ............... | 707/640 |
| 6,625,623 B1* | 9/2003 | Midgley et al. | ............... | 707/640 |
| 6,714,952 B2* | 3/2004 | Dunham et al. | ............... | 707/645 |
| 7,778,962 B2* | 8/2010 | Shah et al. | ..................... | 707/610 |
| 7,788,223 B2* | 8/2010 | Liu et al. | ........................ | 707/618 |
| 7,818,298 B2* | 10/2010 | Barker et al. | .................. | 707/638 |
| 7,900,002 B2* | 3/2011 | Lyon | .............................. | 711/161 |
| 2008/0154777 A1 | 6/2008 | Achiwa | | |
| 2010/0274765 A1* | 10/2010 | Murphy et al. | ............... | 707/652 |

FOREIGN PATENT DOCUMENTS

| JP | 11212846 A | 8/1999 |
|---|---|---|
| JP | 2008152695 A | 7/2008 |

* cited by examiner

*Primary Examiner* — Cam-Linh Nguyen
(74) *Attorney, Agent, or Firm* — Brundidge & Stanger, P.C.

(57) ABSTRACT

Even if the version of the OS and DB is changed, occurrence of inconsistency in the correspondence relationship between the original version meta information and the new version real data is prevented. When a node managing a plurality of files is to return the version of the OS and DB of a plurality of files from the new version to the original version, the node deletes meta information A11 of the file A regarding such deleted file A, updates meta information B11 according to the updated real data B1 regarding such file B in which the real data has been updated, creates meta information based on real data of the added file D regarding such added file D, and thereby maintains the consistency in the correspondence relationship between the meta information of the respective original versions and the real data of the respective new versions regarding the respective files A, B, and D.

15 Claims, 21 Drawing Sheets

FIG.10

| HASH VALUE FIELD | ASSOCIATED NODE FIELD | PAIR NODE FIELD |
|---|---|---|
| 0 | 1 | 3 |
| 1 | | |
| 2 | | |
| ... | | |
| 7 | | |
| 8 | 2 | 4 |
| 9 | | |
| 10 | | |
| ... | | |
| 15 | | |
| ... | ... | ... |
| | N | |

| NODE | OS VERSION (EXISTING) | DB VERSION (EXISTING) | OS VERSION (BACKUP) | DB VERSION (BACKUP) |
|---|---|---|---|---|
| 1 | 2.0 | 2.2 | 1.0 | 1.1 |
| 2 | 2.0 | 2.2 | 1.0 | 1.1 |
| 3 | 2.0 | 2.2 | 1.0 | 1.1 |
| 4 | 2.0 | 2.2 | 1.0 | 1.1 |

FIG.16

| NODE | PAIR NODE |
|---|---|
| 1 | PAIR NODE 1 |
| 2 | PAIR NODE 2 |
| 3 | PAIR NODE 1 |
| 4 | PAIR NODE 2 |

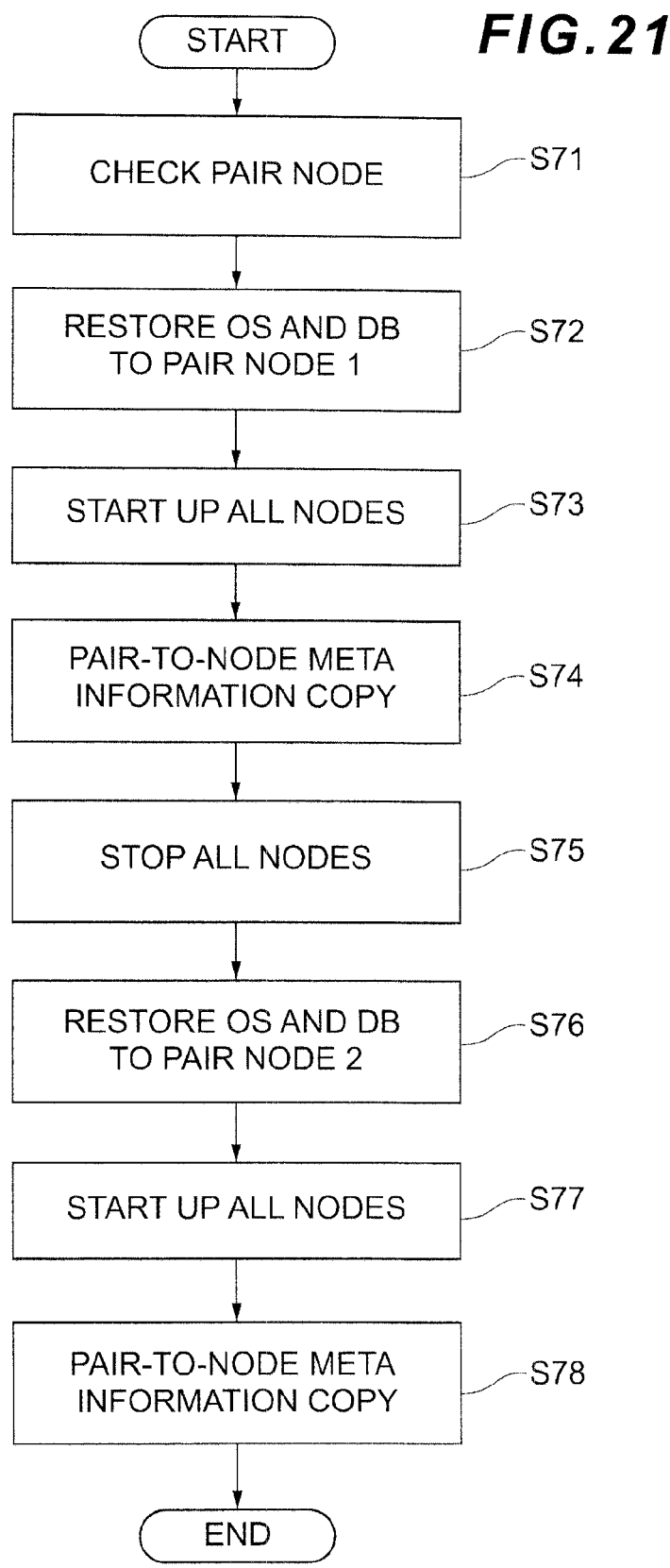

STORAGE SYSTEM AND ITS FILE MANAGEMENT METHOD

CROSS REFERENCE TO RELATED APPLICATIONS

The present application claims priority from PCT/JP2009/005874, filed on Nov. 5, 2009, the entire disclosure of which is incorporated herein by reference.

TECHNICAL FIELD

The present invention relates to a storage system and its file management method for managing files stored in a memory device as real data showing the entity of such files, and managing meta information of the files in a database separate from the real data.

BACKGROUND ART

With a storage system comprising a plurality of storage devices, proposed is a type where, in cases of protecting an electronic protection target such as data, the protection target can be protected with the protection capability that is required by such electronic protection target even if the protection capability of each of the plurality of storage devices is different (refer to Patent Literature 1).

In addition, proposed is a type where, in order to protect the data stored in a plurality of storage devices from fault or the like, a data file or database is saved as backup data in a save area, and the backup data in the save area is restored to a restoration area as necessary (refer to Patent Literature 2).

Meanwhile, upon managing the files stored in a plurality of storage devices, the process of managing the entity of the files as real data and managing the meta information of the files as a database separately from the real data is being conducted. Here, if the version of the OS (Operating System) or DB (DataBase) loaded in the file management processor is changed, the file management processor will perform processing for updating the real data in accordance with the version change.

Incidentally, after the version of the OS and DB is upgraded to a new version and the file management processor executes processing according to the new version OS and DB, there are cases where it becomes necessary to return the version of the OS and DB to the original version before the upgrade.

In consideration of the foregoing case, it is necessary to back up the meta information, together with the real data of the files, in a backup system or the like prior to changing the version of the OS and DB to the new version.

CITATION LIST

Patent Literature

[PTL 1]
Japanese Unexamined Patent Application Publication No. 2008-152695
[PTL 2]
Japanese Unexamined Patent Application Publication No. H11-212846

SUMMARY OF INVENTION

Technical Problem

When giving consideration to the change of the version of the OS and DB from the new version to the original version and adopting a configuration of backing up the meta information, together with the real data of the files, in a backup system, the processing associated with the version change can be reliably performed by using the backed up real data and meta information upon changing the version of the OS and DB from the new version to the original version.

Nevertheless, if consideration is given to returning the version of the OS and DB from the new version to the original version and, as the files, the real data and meta information of the original version are both backed up in the backup system, the time required for the backup process will increase pursuant to the increase in the data amount of the real data, and the capacity of the backup system will also increase.

Meanwhile, if a configuration of backing up, as the files, only the information concerning the OS and DB of the original version in the backup system is adopted, even if the data amount of the real data of the files increases, it will be possible to inhibit the increase in the required backup time and capacity of the backup system.

However, if only the information concerning the OS and DB of the original version is backed up in the backup system, when the data that was updated according to the OS and DB of the new version is processed with the OS and DB of the original version, there are cases where inconsistency will arise in the correspondence relationship between the updated real data and the meta information of the original version.

The present invention was devised in view of the problems encountered by the foregoing conventional technology. Thus, an object of this invention is to provide a storage system and its file management method in which, even if the version of the OS and DB is changed, occurrence of inconsistency in the correspondence relationship between the original version meta information and the new version real data is prevented.

Solution to Problem

In order to achieve the foregoing object, the present invention maintains the correspondence relationship between the original version meta information and the new version real data by executing the meta information restoration processing based on the circulation policy or the meta information restoration processing based on the pair-to-pair meta information copy according to the number of files when changing the version of the OS and DB in the process of managing the meta information of files with the DB separately from the real data of the files. Here, regardless of the number of files, it is also possible to execute either the meta information restoration processing based on the circulation policy or the meta information restoration processing based on the pair-to-pair meta information copy.

ADVANTAGEOUS EFFECTS OF INVENTION

According to the present invention, even if the version of the DB and OS is changed, the consistency of the correspondence relationship between the original version meta information and the new version real data can be maintained.

BRIEF DESCRIPTION OF DRAWINGS

FIG. 10 A configuration diagram of a hash map.

FIG. 16 A configuration diagram of a pair node table.

FIG. 21 A flowchart explaining the meta information restoration processing based on the pair-to-pair meta information copy.

DESCRIPTION OF EMBODIMENTS

The concept of the present invention is now explained with reference to FIG. 1 to FIG. 7.

Figure 1:
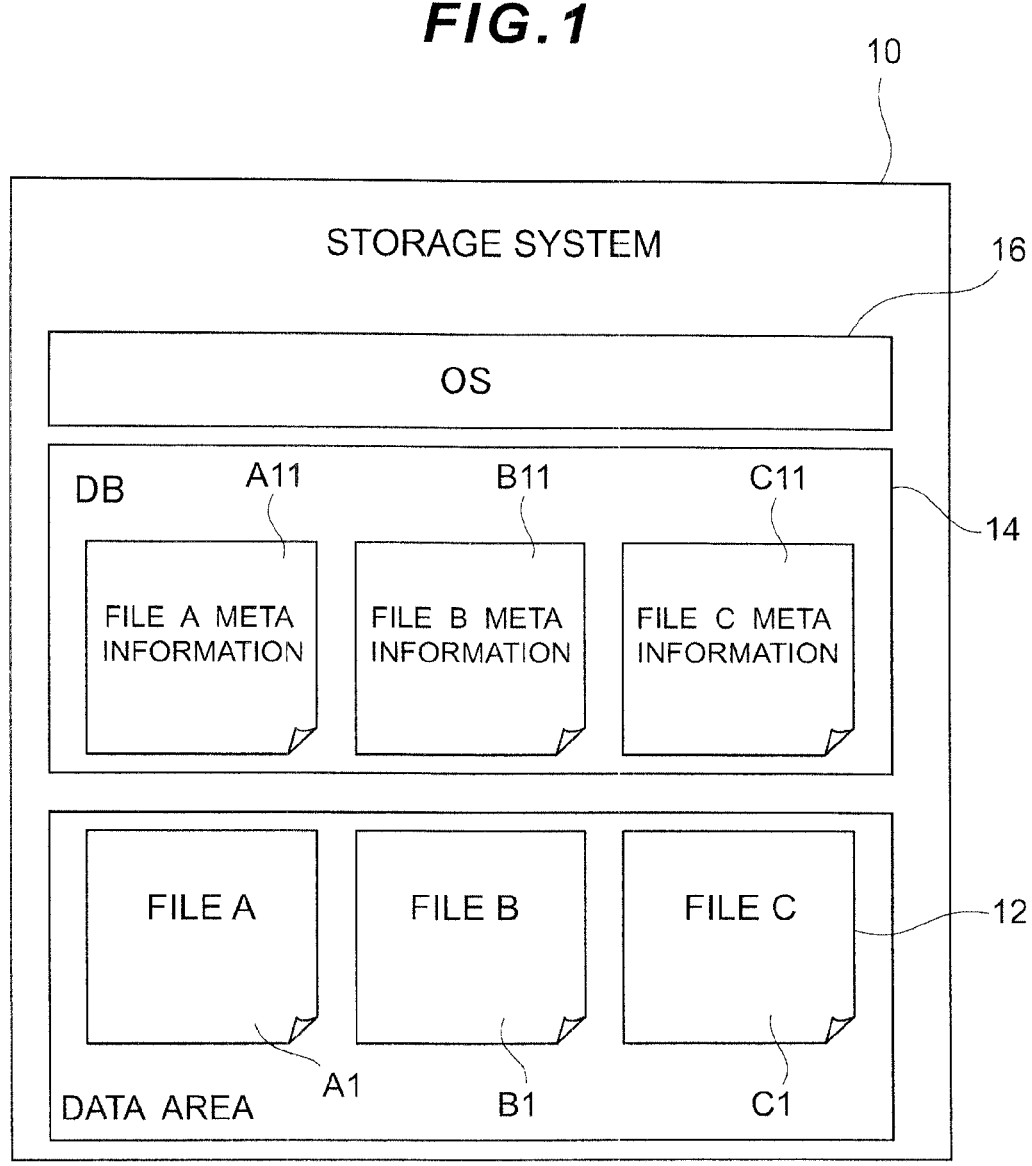
FIG. 1 A view showing a frame format explaining the configuration of the storage system.

Upon configuring a storage system comprising a memory device (not shown) for storing a plurality of files, and a host (host computer) including a processor (not shown) for managing the files stored in the memory device, for instance, as shown in FIG. 1, the storage area of the memory device (not shown) of the storage system 10 is divided into a data area 12, a database area 14 and an OS area 16, real data A1, B1, C1 to become the file entities of files A, B, C are respectively stored in the data area 12, meta information A11, B11, C11 of the files A, B, C is respectively stored in the database area 14, and an OS for starting up the processor is stored in the OS area 16. Here, meta information refers to the storage location of the file, hash value of the file, date of creation/update of the file, and so on.

The meta information A11, B11, C11 is information that is created based on the real data A1, B1, C1 of the respective files A, B, C, and is information showing the storage location of the respective files A, B, C, hash value of the respective files A, B, C, date of creation/update of the respective files A, B, C, file name of the respective files A, B, C, and so on.

Here, if the version of the DB for managing the meta information A11, B11, C11 stored in the database area 14 and the version of the OS stored in the OS area 16 are respectively original versions, the processor will perform update processing to the real data A1, B1, C1 in the data area 12 according to the OS and DB of the original version.

In the present invention, the term "DB" includes the meaning as a database for storing meta information of files, and the meaning as a database management system for managing a database storing meta information of files as, for example, a relational database.

Figure 2:
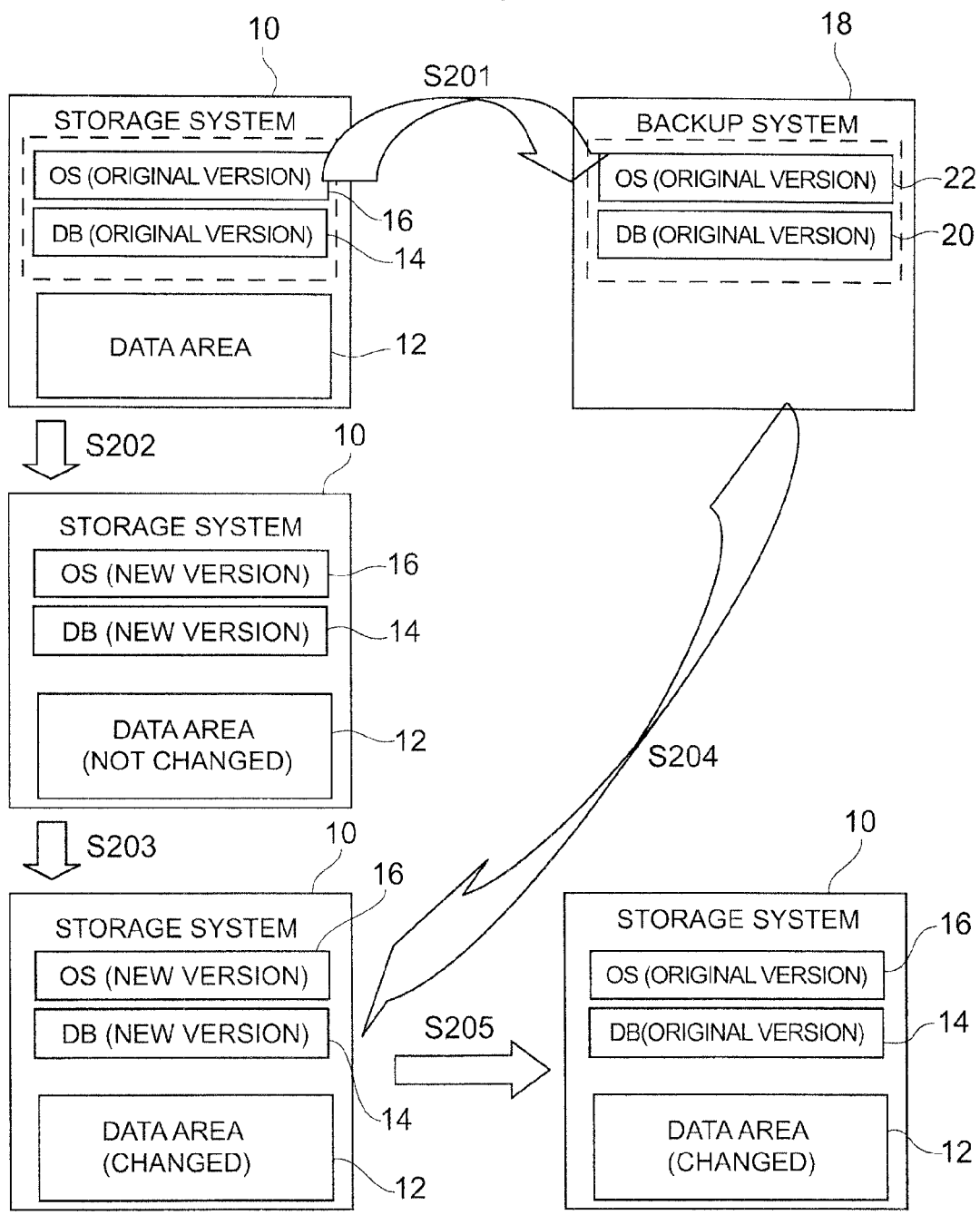
FIG. 2 A view showing a frame format explaining the processing for changing the version of the OS and DB of the storage system.

Here, when giving consideration to a case of upgrading the version of the OS and DB to a new version, as shown in FIG. 2, prior to upgrading the version of the OS and DB to a new version, information concerning the DB stored in the database area 14 is backed up to the database area 20 of the backup system 18 as information concerning the DB of the original version, and the OS stored in the OS area 16 is backed up to the OS area 22 of the backup system 18 as the OS of the original version (S201).

Subsequently, the version of the DB stored in the database area 14 is changed to a new version, and the version of the OS stored in the OS area 16 is also changed to a new version (S202). Here, the real data A1, B1, C1 stored in the data area 12 are in a state (unchanged state) of not being updated by the processor.

When the processor thereafter processes the real data A1, B1, C1 in the data area 12 based on the DB of the new version and the OS of the new version, the real data A1, B1, C1 stored in the data area 12 are updated by the processor, and become a changed state (S203).

Subsequently, if it becomes necessary to respectively return the DB and OS of the new version to the DB and OS of the original version, the DB and OS of the original version stored in the backup system 18 are respectively restored to the database area 14 and the OS area 16 of the storage system 10 (S204).

If the DB and OS of the original version are respectively restored to the database area 14 and the OS area 16 of the storage system 10, the processor will process the real data A1, B1, C1 in the data area 12 according to the DB and OS of the original version (S205).

However, even if the processor processes the real data A1, B1, C1 in the data area 12 according to the DB and OS of the original version, since the real data A1, B1, C1 stored in the data area 12 are respectively the real data (hereinafter sometimes referred to as the "new version real data") that were updated with the DB and OS of the new version, there are cases where an inconsistency will arise in the correspondence relationship between the meta information (hereinafter sometimes referred to as the "original version meta information") A11, B11, C11 managed by the DB of the original version and the new version real data A1, B1, C1.

Figure 3:
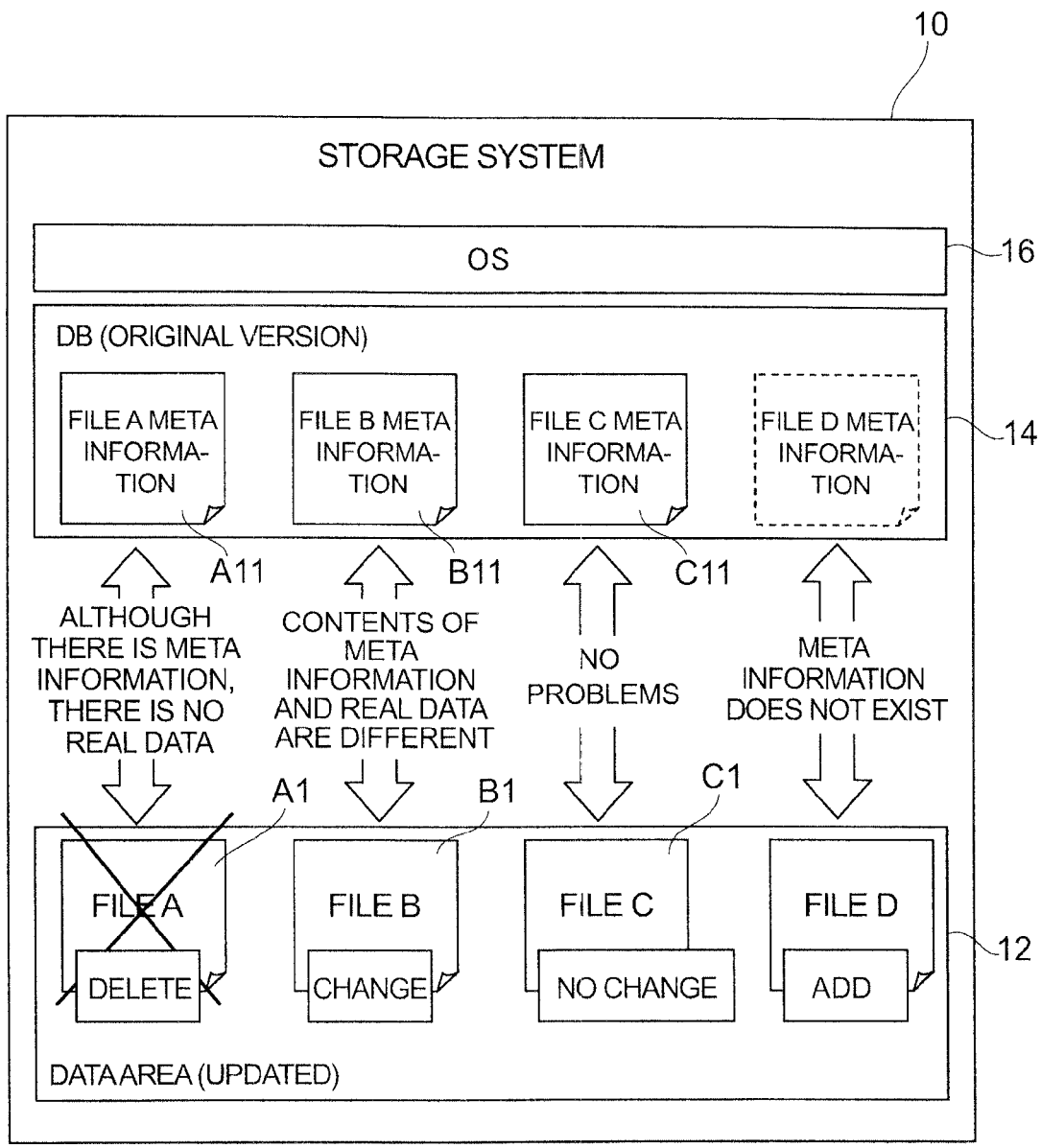
FIG. 3 A view showing a frame format explaining the correspondence relationship of meta information and real data in the database.

For example, as shown in FIG. 3, even if the original version meta information A11 exists in the database area 14 as a file A, if the new version real data A1 does not exist in the data area 12, the correspondence relationship between the original version meta information A11 and the new version real data A1 will become inconsistent.

Moreover, with respect to a file B, if the real data B1 is updated with the DB and OS of the new version, the real data B1 stored in the database area 14 will become the new version real data B1. In the foregoing case, the hash value and date of update of the meta information created from the new version real data B1 will be changed pursuant to the change of the real data B1. Thus, an inconsistency will arise between the new version real data B1 stored in the database area 14 and the original version meta information B11 stored in the database area 14.

If a file D is added after the version of the DB and OS is changed from the original version to the new version, even if the new version real data of the file D exists in the data area 12, since the original version meta information of the file D does not exist in the database area 14, an inconsistency will arise between the new version real data and the original version meta information regarding the added file D.

Since a file C has not been changed and the real data C1 has not been changed according to the DB and OS of the new version, the new version real data C1 stored in the data area 12 and the original version meta information C11 stored in the database area 14 will mutually coincide.

Thus, with the present invention, when the DB and OS of the new version are respectively returned to the DB and OS of the original version, in order to prevent the occurrence of an inconsistency in the correspondence relationship between the original version meta information and the new version real data, meta information restoration processing based on a circulation policy or meta information restoration processing based on pair-to-pair meta information copy is executed upon respectively returning the versions of the DB and OS from the new version to the original version.

The meta information restoration processing based on a circulation policy is foremost explained as the first processing.

Figure 4:
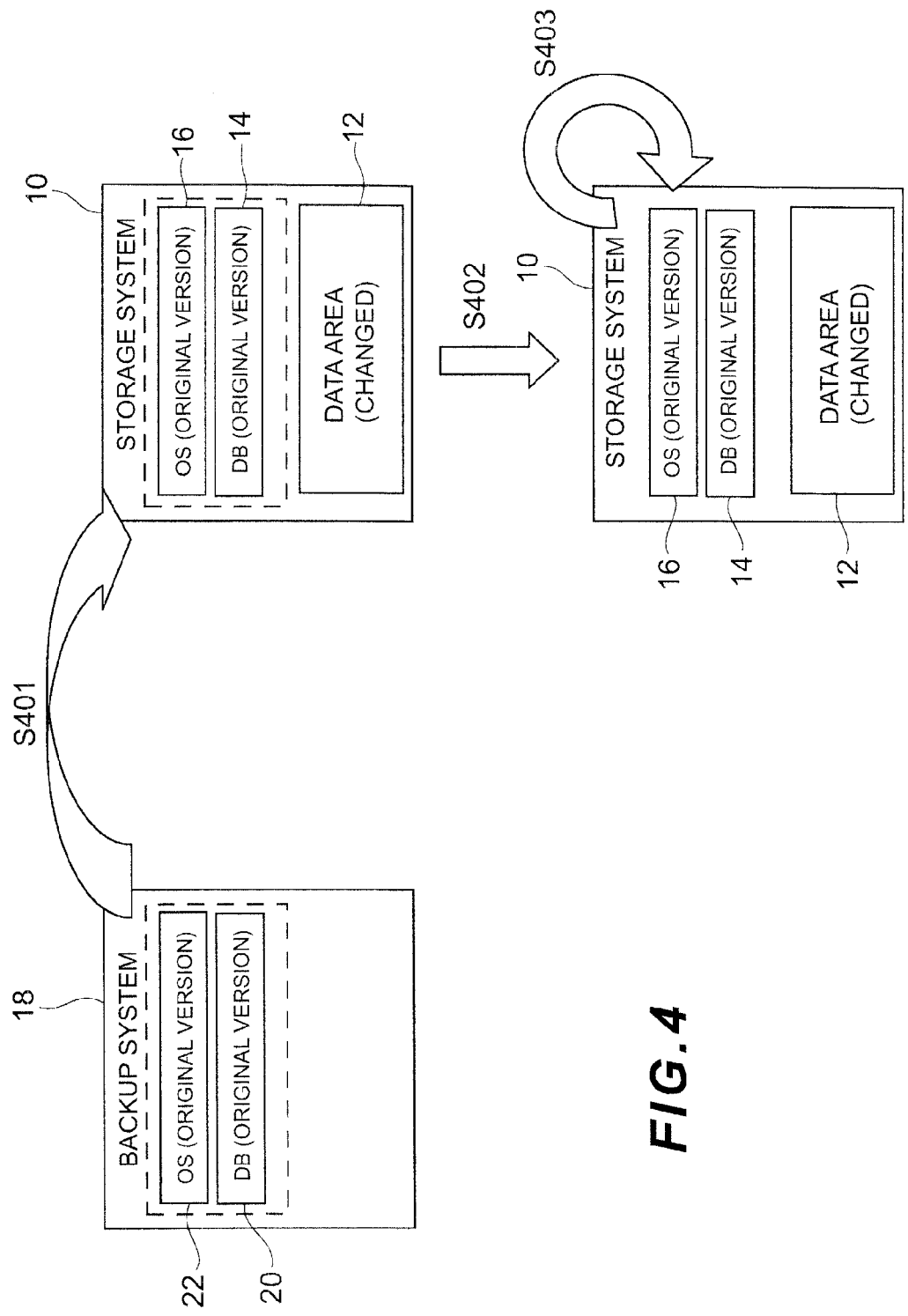
FIG. 4 A view showing a frame format explaining the meta information restoration processing based on the circulation policy.

Upon performing the meta information restoration processing based on a circulation policy, as shown in FIG. 4, the DB and OS of the original version stored in the backup system 18 are respectively restored to the storage system 10, and the DB and OS of the storage system 10 are respectively returned from the new version to the original version (S401).

Here, giving consideration to the fact that the real data A1, B1, C1 of the respective files A, B, C stored in the data area 12 have been updated based on the DB and OS of the new version, meta information restoration processing is executed for creating meta information A11, B11, C11 based on the new version real data A1, B1, C1 by using the new version real data A1, B1, C1 as the real data A1, B1, C1 of the respective files A, B, C stored in the data area 12, and restoring the original version meta information A11, B11, C11 based on the created meta information A11, B11, C11.

Specifically, the circulation policy is executed. In other words, the storage location and date of update of the real data A1, B1, C1 of the respective files A, B, C are checked based on the new version real data A1, B1, C1, and the hash value of the real data A1, B1, C1 is recalculated (S402). Subsequently, the meta information A11, B11, C11 concerning the respective files A, B, C is created based on the check result regarding the respective files A, B, C and the hash value obtained from the recalculation, the created meta information A11, B11, C11 of the respective files A, B, C and the original version meta information A11, B11, C11 are compared, and meta information restoration processing is performed to the files in which the contents do not coincide (S403).

For example, regarding the file A, if the real data A1 of the file A has been deleted, it is not possible to create the new meta information A11 from the new version real data A1, and, when the created meta information A11 and the original version meta information A11 do not coincide, the original version meta information A11 is deleted since this is deemed that the real data A1 as the file entity does not exist.

Consequently, since processing is performed to the file A by deeming that there is no file entity, it is possible to prevent the occurrence of an inconsistency in the correspondence relationship between the original version meta information A11 and the new version real data A1.

Moreover, with respect to the file B, if the real data B1 of the file B has been changed pursuant to the update of the data and the meta information B11 concerning the file B has also been changed, since the contents of the meta information (hereinafter sometimes referred to as the "new version meta information") B11 managed by the DB of the new version and the original version meta information B11 will not coincide, the original version meta information B11 is updated with the new version meta information B11.

Consequently, with respect to the file B, even if the OS and DB are the original version, the contents of the meta information B11 will be the new version meta information B11, and the file entity will be the new version real data B1. Thus, it will be possible to prevent the occurrence of an inconsistency in the correspondence relationship between the original version meta information B11 and the new version real data B1.

Moreover, with a file like a file D which was added after the DB and OS were changed from the original version to the new version, with respect to such added file, meta information is created based on the real data of the added file D, and the created meta information is stored in the database area 14 as the meta information concerning the file D.

Consequently, with respect to the added file D, even if the OS and DB are the original version, the meta information will be the new version meta information and the file entity will be the new version real data. Thus, it will be possible to prevent the occurrence of an inconsistency in the correspondence relationship between the original version meta information and the new version real data.

As described above, as a result of deleting the meta information A11 of the deleted file A regarding the deleted file A, updating the meta information B11 according to the updated real data B1 regarding the file B in which the real data was updated, and creating meta information based on the real data of the added file D regarding the added file D, the consistency of the correspondence relationship between the original version meta information and the new version real data of the respective files A, C, D can be maintained.

Figure 5:
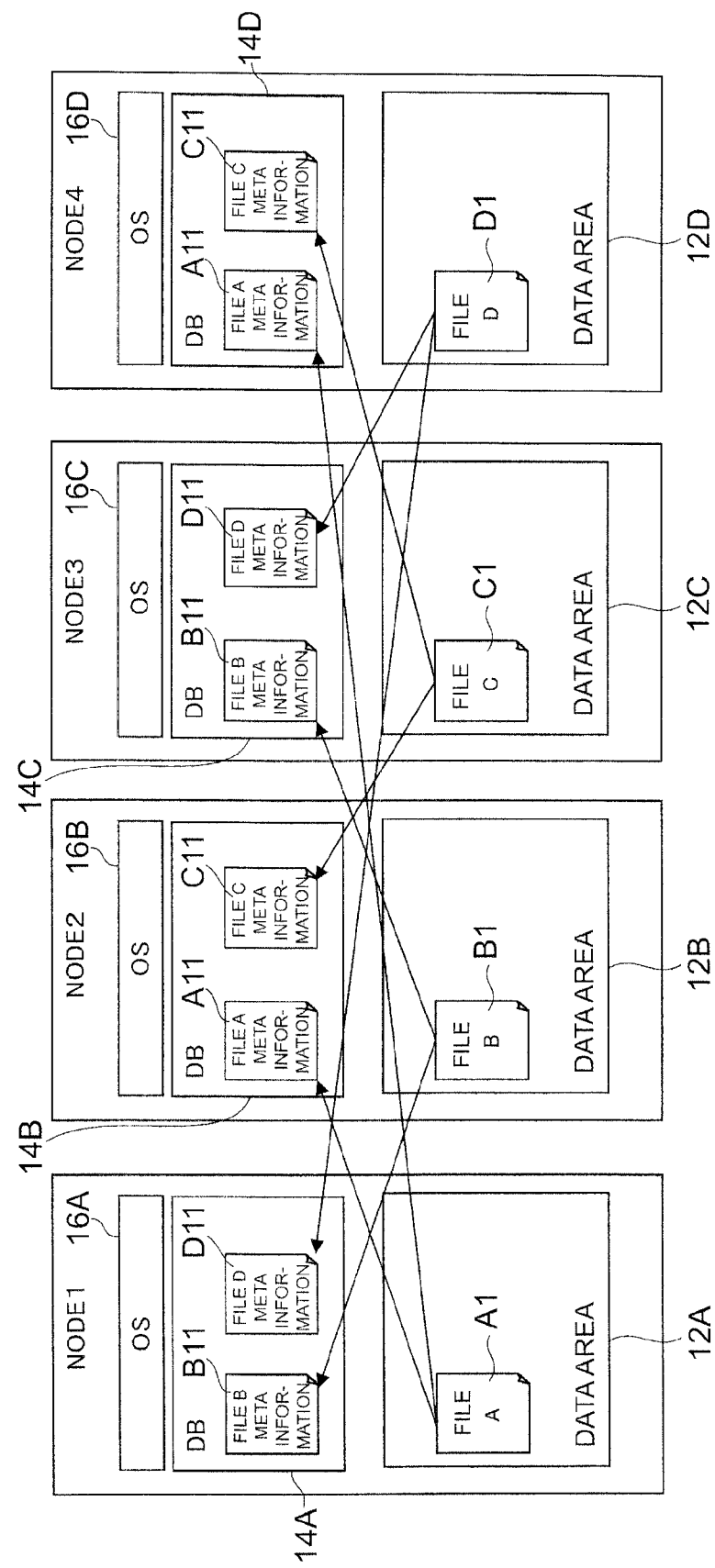
FIG. 5 A view showing a frame format of a storage system explaining the meta information restoration processing based on the pair-to-pair meta information copy.

The meta information restoration processing based on pair-to-pair meta information copy is now explained as the second processing according to FIG. 5. Here, the storage area of the memory device belonging to the storage system 10 is divided into four blocks, and, as a matter of convenience, the components that function as hosts (host computers) or servers that manage data of a plurality of files and the like stored in the storage areas belonging to the respective blocks are defined as node 1, node 2, node 3, and node 4. As storage areas corresponding to the respective nodes 1 to 4, provided are data areas 12A to 12D, database areas 14A to 14D, and OS areas 16A to 16D.

The data areas A1 to D1 respectively store the new version real data A1, B1, C1, D1 of the files A, B, C, D. The database area 14A stores the new version meta information B11, D11 of the files B, D, the database area 14B stores the new version meta information A11, C11 of the files A, C, the database area 14C stores the new version meta information B11, D11 of the files B, D, and the database area 14D stores the new version meta information A11, C11 of the files A, C. The OS areas 16A to 16D respectively store the OS of the new version.

Here, the following matters will be the precondition in performing the meta information restoration processing based on pair-to-pair meta information copy.

(1) The storage system 10 is managed with four nodes 1, 2, 3, 4, and the respective data areas 12A to 12D configure a single virtual file system as a single name and configured as a file system that can be accessed from the outside as a single directory.

(2) The meta information A11, B11, C11, D11 of the respective files A to D is managed redundantly in databases of two or more nodes, and the node pair for redundantly managing the meta information is set in advance.

Specifically, it is decided in advance that the meta information A11 of the file A is managed with the node 2 and the node 4, the meta information B11 of the file B is managed with the node 1 and the node 3, the meta information C11 of the file C is managed with the node 2 and the node 4, and the meta information D11 of the file D is managed with the node 1 and the node 3.

Figure 6:
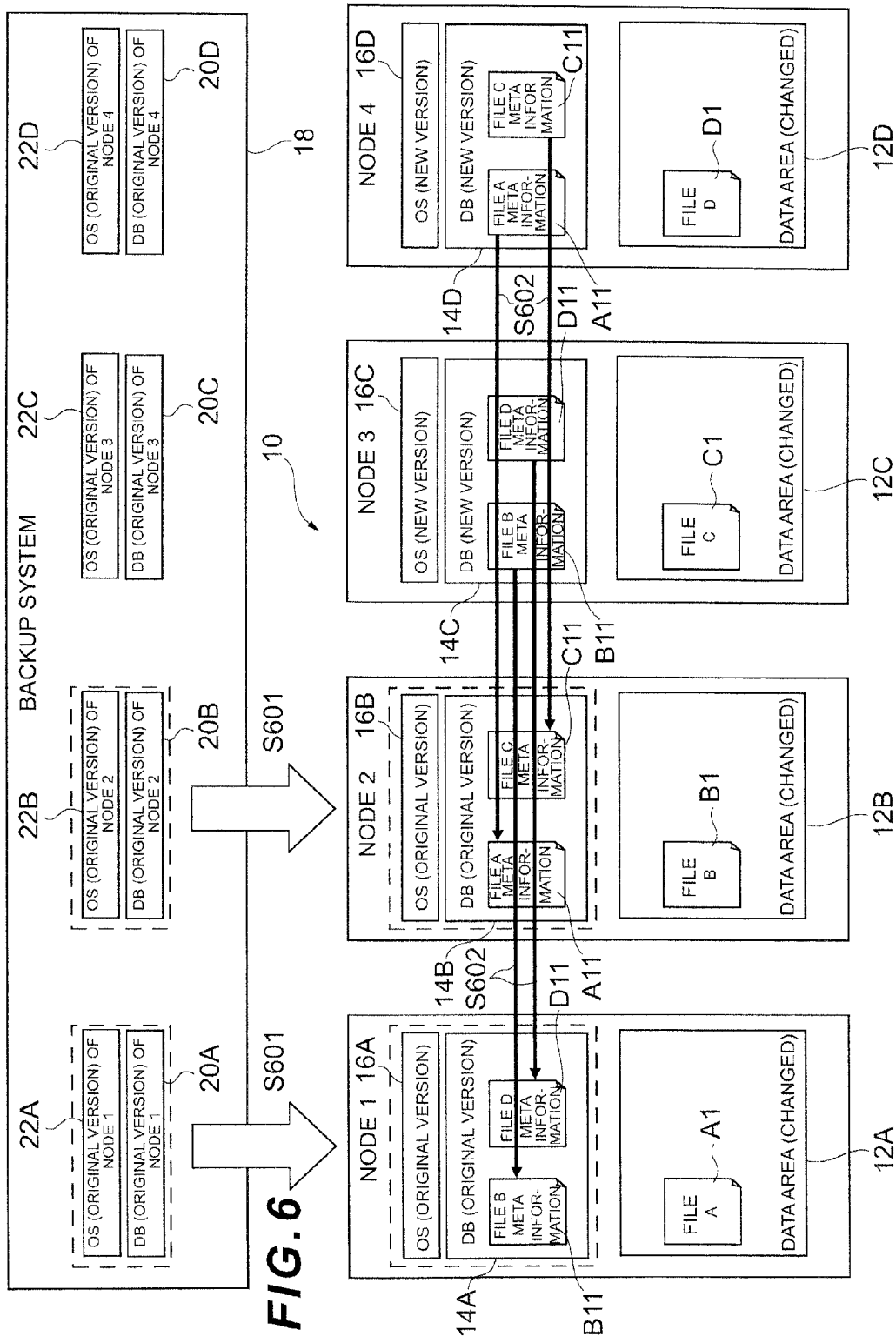
FIG. 6 A view showing a frame format explaining the processing of restoring the OS and DB of the backup system to the node 1 and node 2 of the storage system.

Meanwhile, with the backup system 18, as shown in FIG. 6, the database areas 20A to 20D respectively store the DB of the original version of the node 1 to the node 4, and the OS areas 22A to 22D store the OS of the original version of the node 1 to the node 4.

Here, if it becomes necessary to return the version of the DB and OS of the node 1 to the node 4 from the new version to the original version during the course of processing the real data A1 to D1 stored in the data areas 12A to 12D based on the DB and OS of the new version, foremost, the DB and OS of the original version stored in the backup system 18 are respectively restored to the database areas 14A, 14B and the OS areas 16A, 16B of the node 1 and the node 2 of the storage system 10 (S601). Specifically, the version of the DB and OS is returned from the new version to the original version regarding the node 1 and the node 2.

Subsequently, the new version meta information B11, D11 stored in the database area 14C of the node 3 is respectively copied to the database area 14A of the node 1. Similarly, the new version meta information A11, C11 stored in the database area 14D of the node 4 is respectively copied to the database area 14B of the node 2 (S602).

Specifically, after returning the version from the new version to the original version regarding the node 1 and the node 2, the meta information B11, D11 and the meta information A11, C11 are respectively changed to the new version meta information.

Figure 7:
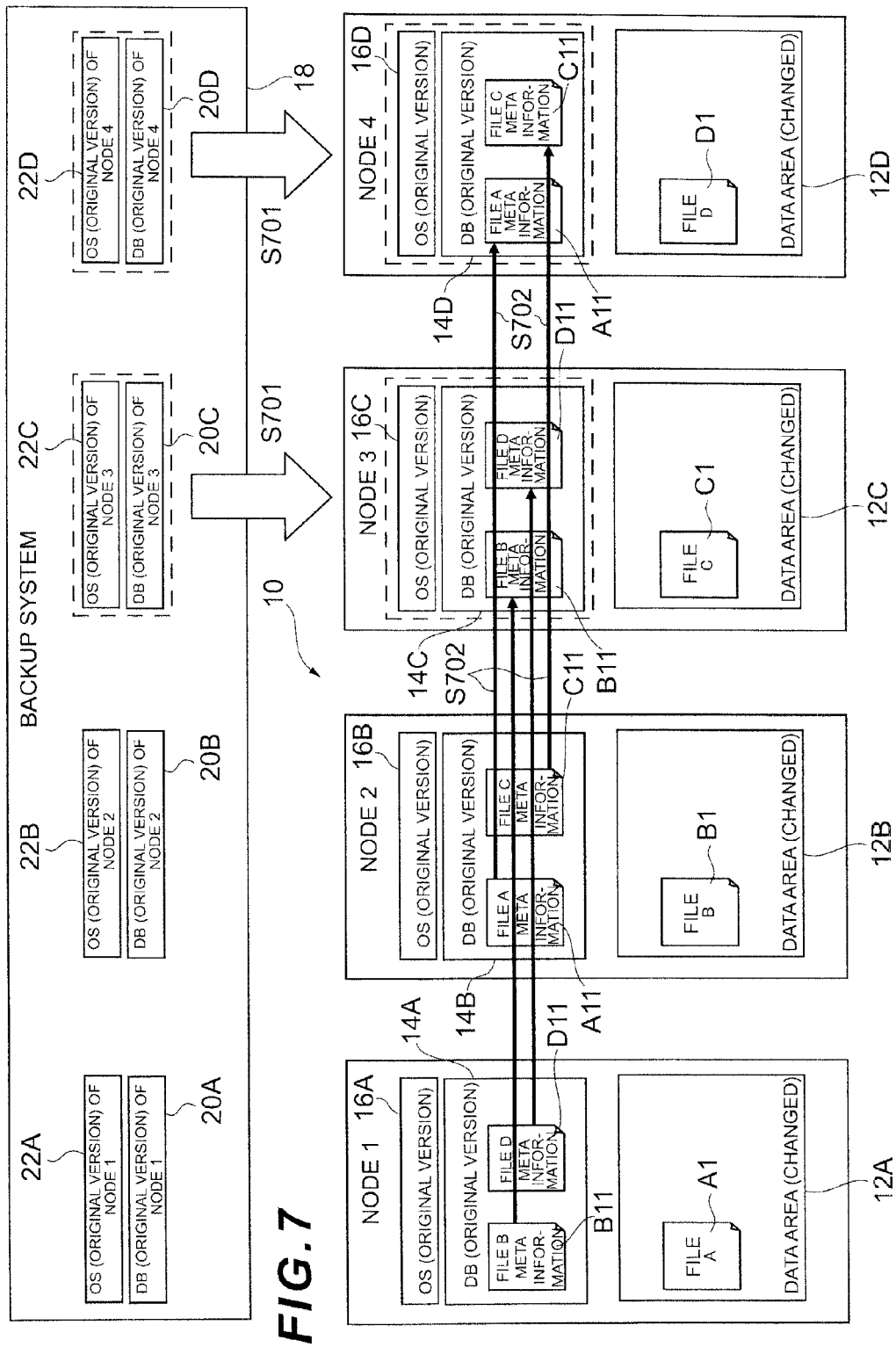
FIG. 7 A view showing a frame format explaining the processing of restoring the OS and DB of the backup system to the node 3 and node 4 of the storage system.

Subsequently, as shown in FIG. 7, the DB and OS of the original version stored in the backup system 18 are respectively restored to the database areas 14C, 14D and the OS areas 16C, 16D of the node 3 and the node 4 (S701). Consequently, the version of the DB and OS of the node 3 and the node 4 will be changed from the new version to the original version.

The meta information restored to the database areas 14C, 16D at such time will be the original version meta information. Thus, the new version meta information B11, D11 stored in the node 1 is copied to the database area 14C of the node 3, and the new version meta information A11, C11 stored in the node 2 is copied to the database area 14D of the node 4, respectively (S702).

Consequently, with the node 1 to the node 4, although the version of the DB and OS will be returned from the new version to the original version, the new version meta information will be stored as the meta information. Thus, if the real data A1 to D1 stored in the data areas 12A to 12D are updated with the DB and OS of the new version, upon comparing the new version real data A1 to D1 and the new version meta information A11 to D11 of the respective files A to D in the respective nodes 1 to 4, the consistency of the correspondence relationship between the new version real data A1 to D1 and the new version meta information A11 to D11 of the respective files A to D can be maintained.

EXAMPLES

An example of the present invention is now explained with reference to the attached drawings.

Figure 8:
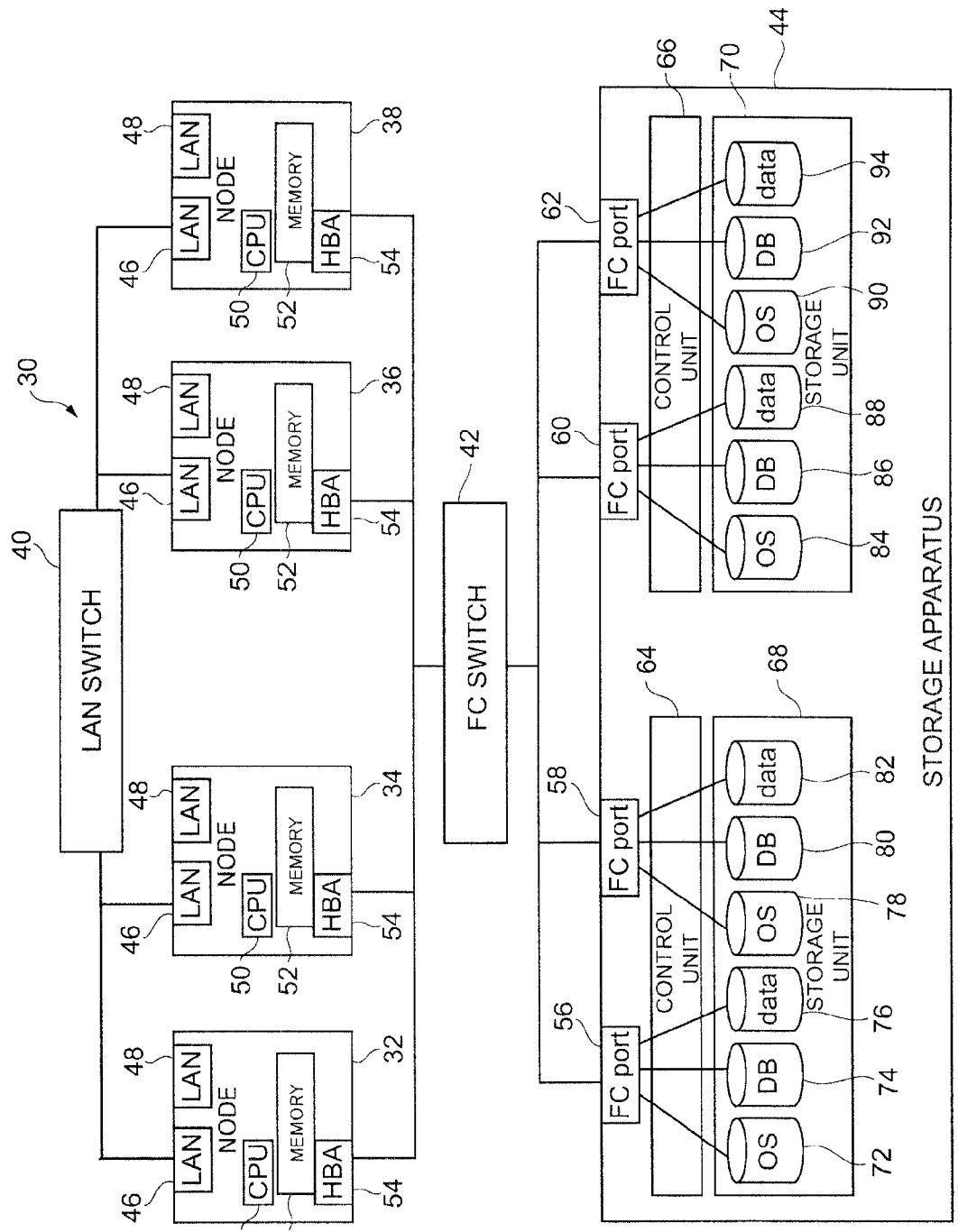
FIG. 8 A configuration diagram showing the basic configuration of the storage system according to the present invention.

FIG. 8 shows the basic configuration of the storage system. The storage system 30 comprises, as a file management control storage system, nodes 32, 34, 36, 38, a LAN (Local Area Network) switch 40, an FC (Fibre Channel) switch 42, and a storage apparatus 44. The LAN switch 40 is configured, for instance, with a LAN as the first network, and the FC switch 42 is configured, for instance, with an FC as the second network.

The respective nodes 32 to 38 comprise LAN ports 46, 48, a processor (CPU: Central Processing Unit) 50, a memory 52, and a host bus adapter (HBA) 54, and is configured as a controller or a server for sending and receiving information to and from the storage apparatus 44 via the FC switch 42. Incidentally, a controller for governing and controlling the processor 50 of the respective nodes 32 to 38 may also be provided, and the controller may be configured as a host (host computer) for controlling the overall storage apparatus 44.

With the nodes 32, 34, the LAN ports 46 are mutually connected, and these LAN ports 46 are connected to the LAN ports 46 of the nodes 36, 38 via the LAN switch 40. In addition, with the nodes 32 to 38, the host bus adapters 54 are mutually connected, and the respective host bus adapters 54 are connected to the storage apparatus 44 via the FC switch 42.

The memory 52 of the respective nodes 32 to 38 stores control programs and the like, and the processor 50 executes processing according to the control programs. Here, the processor 50 of the respective nodes 32 to 38 sends and receives information to and from the other nodes via the LAN port 46, and sends and receives information to and from the storage apparatus 44 via the host bus adapter 54 and the FC switch 42.

The storage apparatus 44 comprises FC ports 56, 58, 60, 62, control units 64, 66, and storage units 68, 70.

The FC ports 56 to 62 are mutually connected as an interface for connecting the storage apparatus 44 and the FC switch 42, and connected to the host bus adapter (HBA) 54 via the FC switch 42.

The control unit 64 comprises a microprocessor, a cache memory, a micro program and the like, and, with the FC ports 56, 58 as the interface, is configured as a storage controller for sending and receiving information to and from the respective nodes 32, 34, and sending and receiving data to and from the storage unit 68. The control unit 66 comprises a microprocessor, a cache memory, a micro program and the like, and, with the FC ports 60, 62 as the interface, is configured as a storage controller for sending and receiving information to and from the respective nodes 36, 38, and sending and receiving data to and from the storage unit 70.

The storage unit 68 comprises a plurality of HDDs (Hard Disk Drives) as memory devices, and the logical storage devices 72 to 82 are configured from one or more HDDs. The storage unit 70 comprises a plurality of HDDs as memory devices, and the logical storage devices 84 to 94 are configured from one or more HDDs.

The storage devices 76, 82, 88, 94 store real data to become the file entity of the plurality of files. The storage devices 74, 80, 86, 92 store meta information of the respective files, and each piece of meta information is managed with a DB or a DB management system. The storage devices 72, 78, 84, 90 store an OS for starting up the respective microprocessors.

Incidentally, the node 32 and the storage devices 72 to 76 correspond to the node 1 shown in FIG. 5, the node 34 and the storage devices 78 to 82 corresponds to the node 2, the node 36 and the storage devices 84 to 88 correspond to the node 3, and the node 38 and the storage devices 90 to 94 correspond to the node 4.

Figure 9:
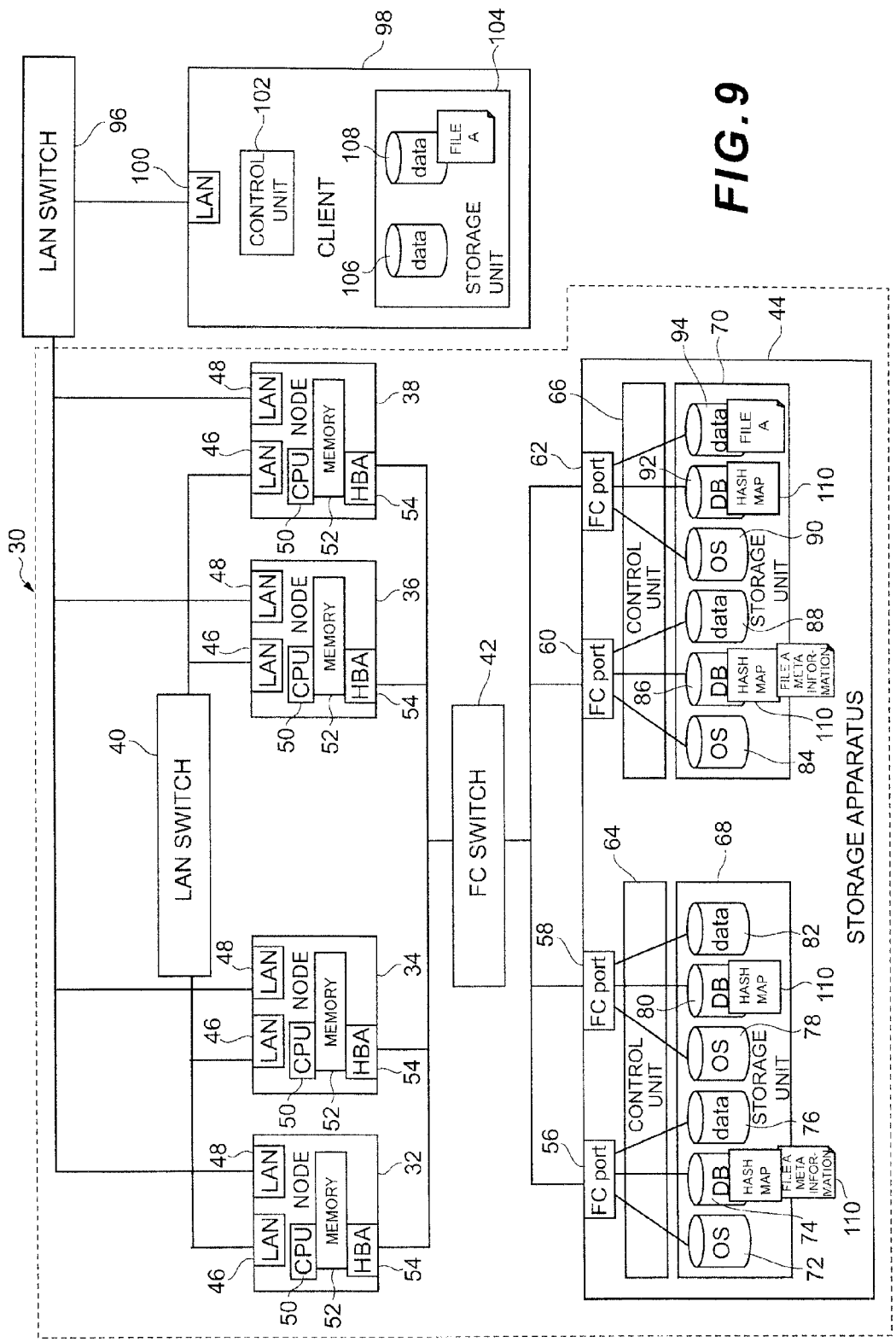
FIG. 9 A configuration diagram showing the configuration upon connecting a client to the storage system.

FIG. 9 shows the configuration of the storage system 30 during the client access. When a client is to make a write access or a read access to the storage system 30, the client (client terminal) 98 is connected to the LAN port 48 of the respective nodes 32 to 38 via the LAN switch 96.

The client 98 comprises a LAN port 100, a control unit 102, and a storage unit 104, and the LAN port 100 is connected to the LAN switch 96. The storage unit 104 comprises storage devices 106, 108 as memory devices, and the storage device 108 stores, for example, real data of the file A as information concerning a plurality of files.

The control unit 102 comprises a processor, a cache memory, and a micro program. The processor of the control unit 102 loads the real data of the file A stored in the storage device 108, transfers the loaded real data of the file A to the respective nodes 32 to 38 via the LAN port 100 and the LAN switch 96, and also performs processing for storing the data transferred from the respective nodes 32 to 38 to the storage devices 106, 108.

In connection with the client 98 making a write access or a read access to the storage system 30, the storage devices 74, 80, 86, 92 of the storage apparatus 44 store information concerning the hash map 110 as shown in FIG. 10.

The hash map 110, as shown in FIG. 10, is configured from a hash value field 112, an associated node field 114, and a pair node field 116.

The respective entries of the hash value field 112 store, as a numerical value, the hash value showing that the file A has not been updated, or that the file A has been damaged. The entry of the associated node field 114 stores, as a numerical value, the associated node to which meta information should be stored according to the hash value. The pair node field 116 stores the number of the node configuring the pair with the associated node.

Here, the "1" in the associated node field 114 corresponds to the node 32, the "2" in the associated node field 114 corresponds to the node 34, the "3" in the pair node field 116 corresponds to the node 36, and the "4" in the pair node field 116 corresponds to the node 38.

For instance, if the hash value obtained from the real data of the file A is "0 to 7," this means that the node 32 is in charge as the storage destination of the meta information, and the node 36 is the pair node of the node 32. In addition, if the hash value is "8 to 15," this means that the node 34 is in charge as the storage destination of the meta information, and the node 38 is the pair node of the node 34.

Figure 11:
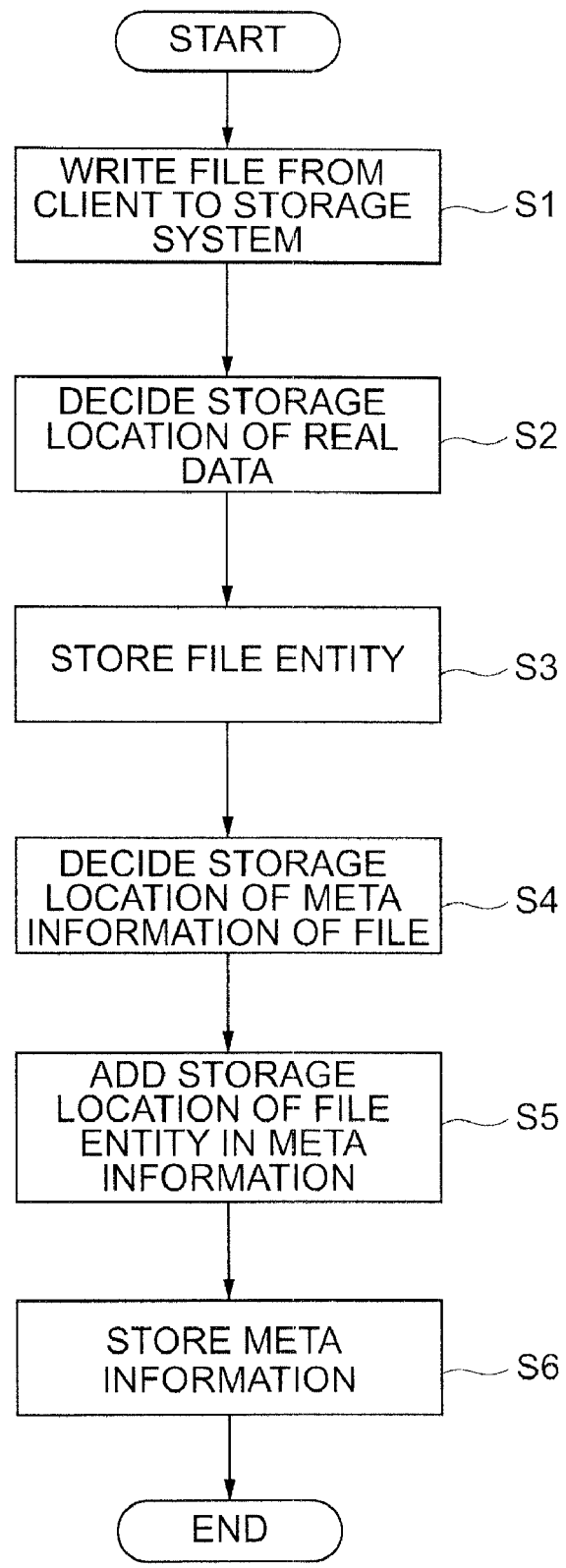
FIG. 11 A flowchart explaining the write access processing performed by a client.

The write access processing by the client is now explained with reference to the flowchart of FIG. 11.

Foremost, the client 98 starts the file write processing to the storage system 30 upon making a write access to the storage system 30 (S1). For example, when the client 98 is to make a write access of the file A stored in the storage device 108, it transfers the write processing command of the file A to the respective nodes 32 to 38 via the LAN port 100 and the LAN switch 96.

The respective nodes 32 to 38 mutually communicate via the LAN port 46 and the LAN switch 40 to inquire the unused capacity of the respective nodes, and decide the node with the greatest unused capacity; for instance, it decides the node 38 as the storage location of the real data as the file entity (S2).

Subsequently, as the processing for storing the file entity of the file A, the client 98 transfers the real data of the file A to the node 38 via the LAN switch 96 and issues a command for storing the file entity of the file A (S3). Consequently, the node 38 causes the storage device 94 to store the real data of the file A via the FC switch 42.

Subsequently, the node 38 performs processing for deciding the storage location of the meta information of the file A (S4).

Specifically, the node 38 calculates the hash value based on the directory path of the file A, compares the calculated hash value and the hash map 110, and decides the associated node to become the storage destination of the meta information. For example, if the associated node corresponding to the hash value is "1" and the pair node is "3," the node 32 is decided as the associated node, and the node 36 is decided as the pair node. The respective nodes 32, 36 decide the storage devices 74, 88 as the storage destination of the meta information of the file A.

Subsequently, the respective nodes 32, 36 add the meta information of the file A to the storage location of the real data as the entity of the file A (S5). Specifically, the respective nodes 32, 36 set the storage devices 74, 86 as the storage location of the meta information of the file A, and thereafter add, as the meta information of the file A, the storage device 94 as the storage location of the real data of the file A.

Subsequently, the node 38 transfers the meta information of the file A to the nodes 32, 36, and issues a command for storing the meta information (S6). Consequently, the nodes 32, 36 store the meta information of the file A in the storage devices 74, 86, respectively, and thereby end the processing of this routine.

Here, the respective nodes 32, 36 store the meta information of the file A in the storage devices 74, 86, respectively, and add the storage device 94 as the storage location of the real data of the file A so as to enable the management of the meta information of the file A and the storage location of the file A with the DB.

Figure 12:
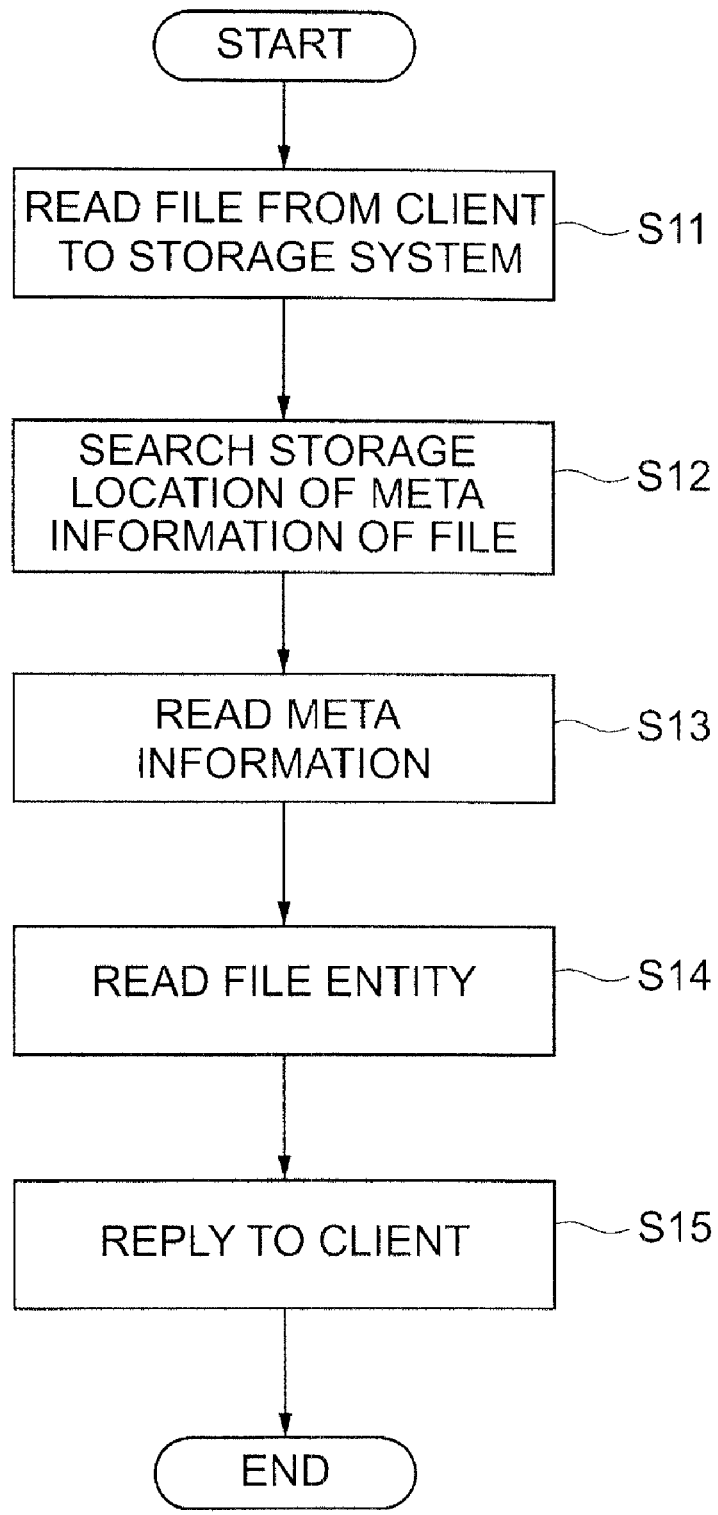
FIG. 12 A flowchart explaining the read access processing performed by a client.

The read access processing by the client is now explained with reference to the flowchart of FIG. 12.

Foremost, the client 98 issues a file read command to the storage system 30 upon making a read access to the storage system 30 (S11). For example, the client 98 issues a file read command via the LAN switch 96 to one node; for instance, to the node 38 among the nodes 32 to 38.

Subsequently, the node 38 performs processing for searching the storage location of the meta information of the file A (S12). For example, the node 38 calculates the hash value from the directory path of the file A, compares the calculated hash value and the hash map 110, checks the associated node storing the meta information of the file A, and issues a processing command to the associated node based on the result of the foregoing check.

For example, if the associated node is "1" based on the hash value, the node 38 issues a processing command to the node 32. The node 32 that received the command access the storage device 74 belonging to the self-node via the FC port 56, reads the meta information of the file A, and transfers the read meta information of the file A to the node 38 (S13). Here, the node 38 identifies that the storage device 94 is the storage location of the real data of the file A from the storage location of the entity that was added to the meta information stored in the storage device 74.

Subsequently, the node 38 performs the read processing of the file entity of the file A (S14). For example, if it is identified that the file entity of the file A is stored in the storage device

94, the node 38 reads the real data, as the entity of the file A, from the storage device 94 via the FC switch 42 and the FC port 62.

Subsequently, the node 38 executes the reply processing to the client 98 (S15). Specifically, the node 38 transfers the real data as the file entity of the file A to the client 98 via the LAN switch 96, and thereby ends the processing of this routine.

In order to balance the load of the respective nodes 32 to 38, the meta information of the respective files is distributed and stored in the plurality of storage devices 74, 80, 86, 92.

Figure 13:
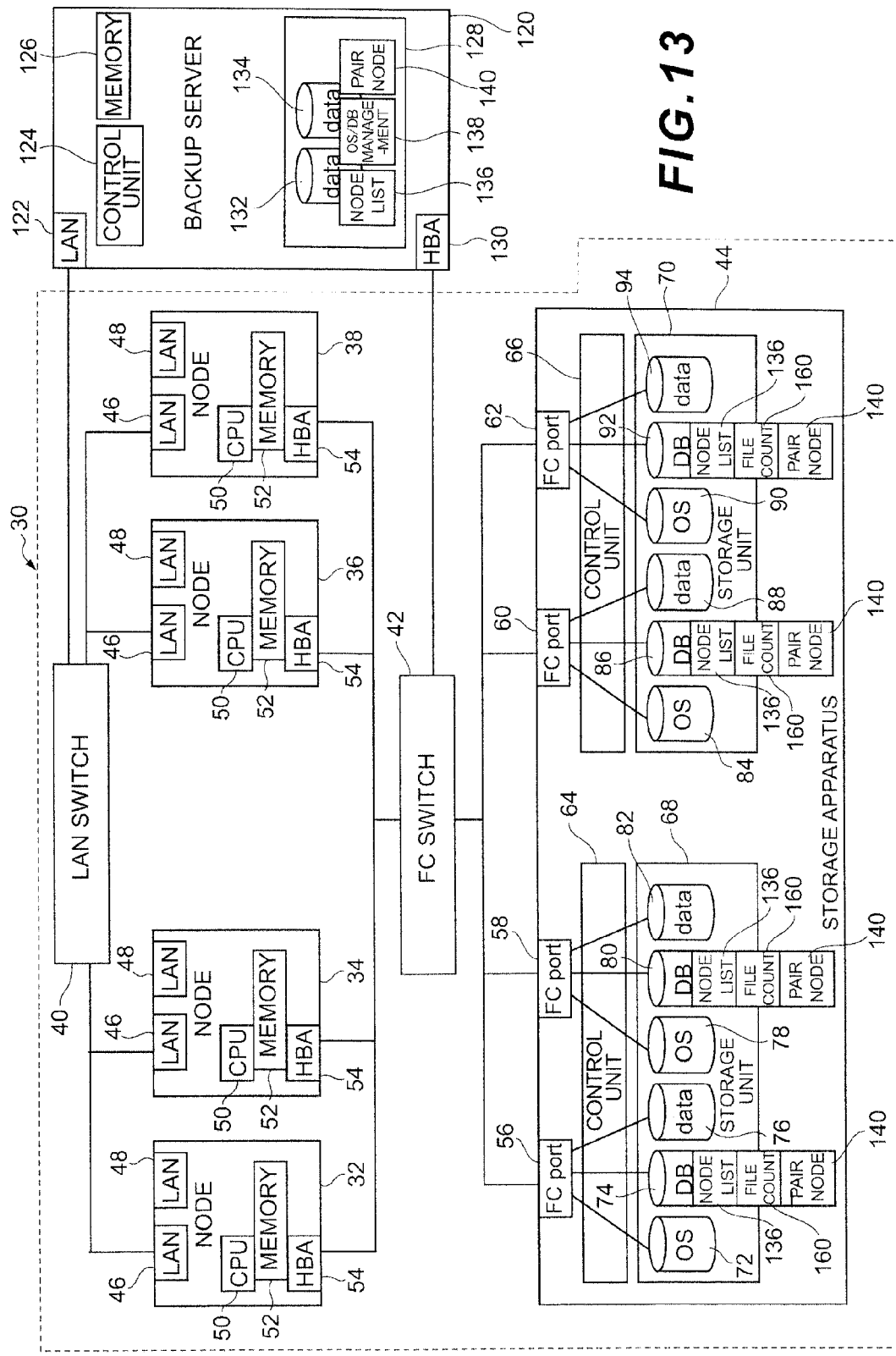
FIG. 13 A configuration diagram showing the configuration upon connecting a backup server to a storage system.

FIG. 13 shows the configuration upon connecting the backup server to the storage system.

In FIG. 13, the backup server 120 comprises a LAN port 122, a control unit 124, a memory 126, a storage unit 128, and a host bus adapter (HBA) 130, the LAN port 122 is connected to the LAN switch 40, and the host bus adapter 130 is connected to the FC switch 42.

The memory 126 stores, for instance, programs such as an upgrade program, a backup program, and a restoration program.

The control unit 124 is configured as a backup controller including a processor and a cache memory. The processor of the control unit 124 performs processing according to the various programs stored in the memory 126, send and receive information to and from the respective nodes 32 to 38 via the LAN port 122 and the LAN switch 40, and send and receive information to and from the storage apparatus 44 via the host bus adapter 130 and the FC switch 42.

The storage unit 128 comprises storage devices 132, 134 as backup memory devices, and the respective storage devices 132, 134 store information concerning a node list table 136, an OS/DB management table 138, and a pair node table 140.

Figure 14:
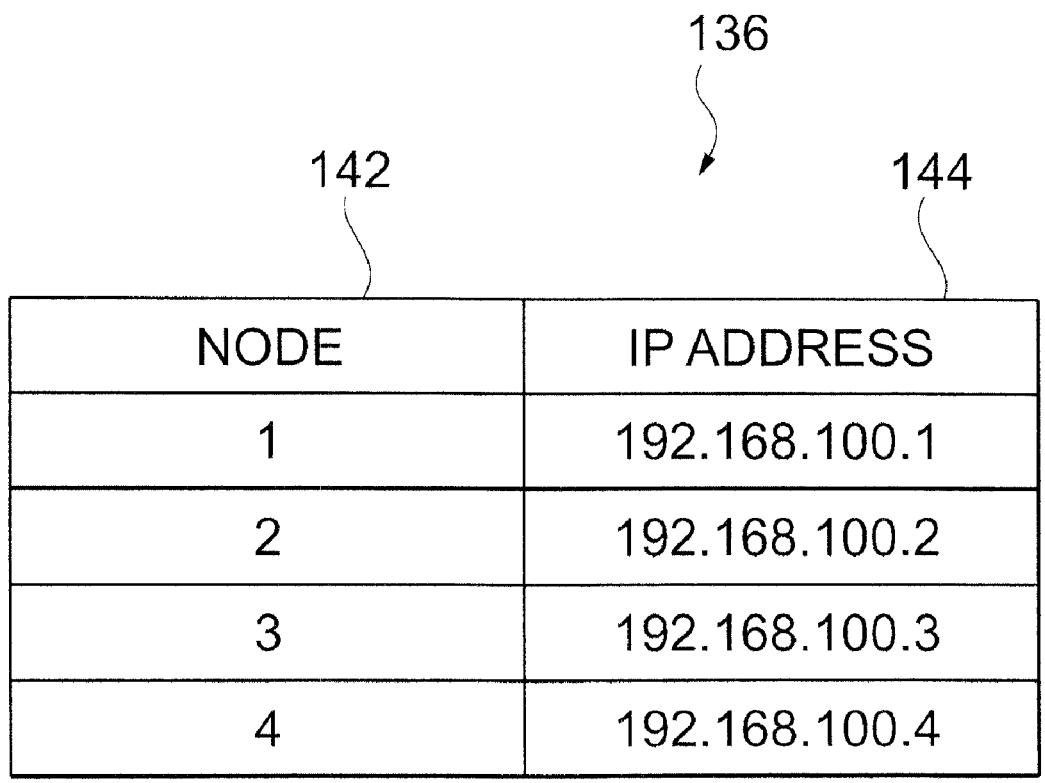
FIG. 14 A configuration diagram of a node list table.

The node list table 136, as shown in FIG. 14, is configured from a node field 142, and an IP (Internet Protocol) address field 144. The node field 142 stores the number of the node corresponding to the nodes 32 to 38, and the IP address field 144 stores the number of the IP address corresponding to the nodes 32 to 38.

Incidentally, in the node field 142, "1" corresponds to the node 32, "2" corresponds to the node 34, "3" corresponds to the node 36, and "4" corresponds to the node 38. In the ensuing explanation, the node numbers "1 to 4" in the node field of the OS/DB management table 138 and the pair node table 140 also correspond to the nodes 32 to 38.

Figure 15:
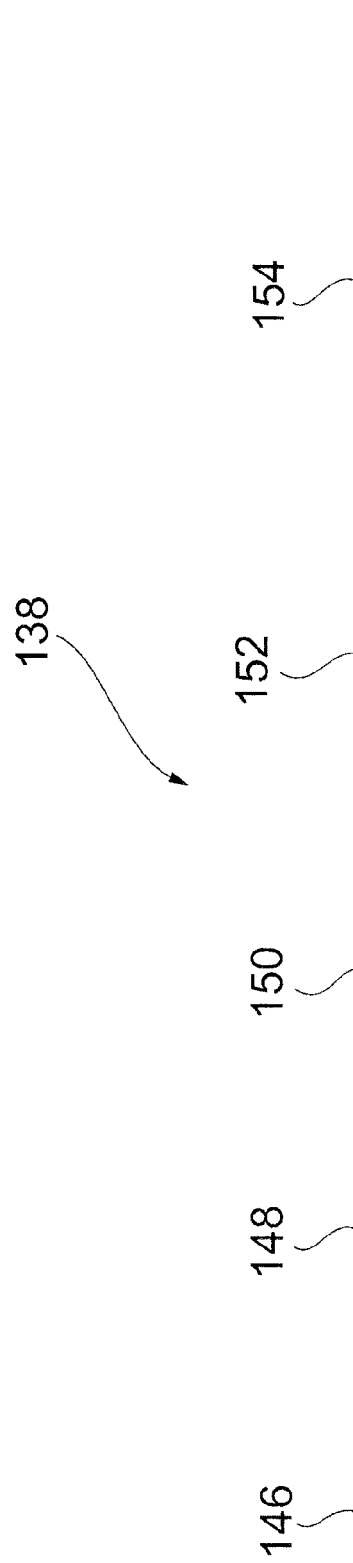
FIG. 15 A configuration diagram of an OS/DB management table.

The OS/DB management table 138, as shown in FIG. 15, is configured from a node field 146, an OS version field 148, a DB version field 150, an OS version field 152, and a DB version field 154.

The node field 146 stores the number of the node corresponding to the nodes 32 to 38, and the OS version field 148 stores "2.0" as the version of the current OS corresponding to the nodes 32 to 38. The DB version field 150 stores "2.2" as the current version of the DB corresponding to the nodes 32 to 38. The OS version field 152 stores "1.0" as the version of the OS to be backed up and which is the original version in correspondence with the nodes 32 to 38. The DB version field 154 stores "1.1" as the version of the DB to be used for backup and which is the original version in correspondence with the nodes 32 to 38.

Incidentally, the current version refers to the new version when the version of the OS and DB is upgraded from the original version (version that was backed up) to the new version.

The pair node table 140, as shown in FIG. 16, is configured from a node field 156, and a pair node field 158. The node field 156 stores the number of the node corresponding to the nodes 32 to 38. The pair node field 158 stores the number of the pair node configuring the pair with the nodes 32 to 38. For example, if the pair node field 158 stores "pair node 1," the node 32 corresponding to the node 1 and the node 36 corresponding to the node 3 configure the pair, and if the pair node field 158 stores "pair node 2," the node 34 corresponding to the node 2 and the node 38 corresponding to the node 4 configure the pair.

Information concerning the node list table 136, the OS/DB management table 138 and the pair node table 140 is stored in the storage devices 74, 80, 86, 92 of the storage apparatus 44 based on the processing of the backup server 120, and is managed with the DB or the DB management system. Moreover, when the file entity of the respective files is to be stored in the respective storage devices 76, 82, 88, 94, the number of the respective files is calculated by the respective nodes 32 to 38, and each calculated value is stored in the storage devices 74, 80, 86, 92 as the file count 160, and managed with the DB or the DB management system.

Figure 17:
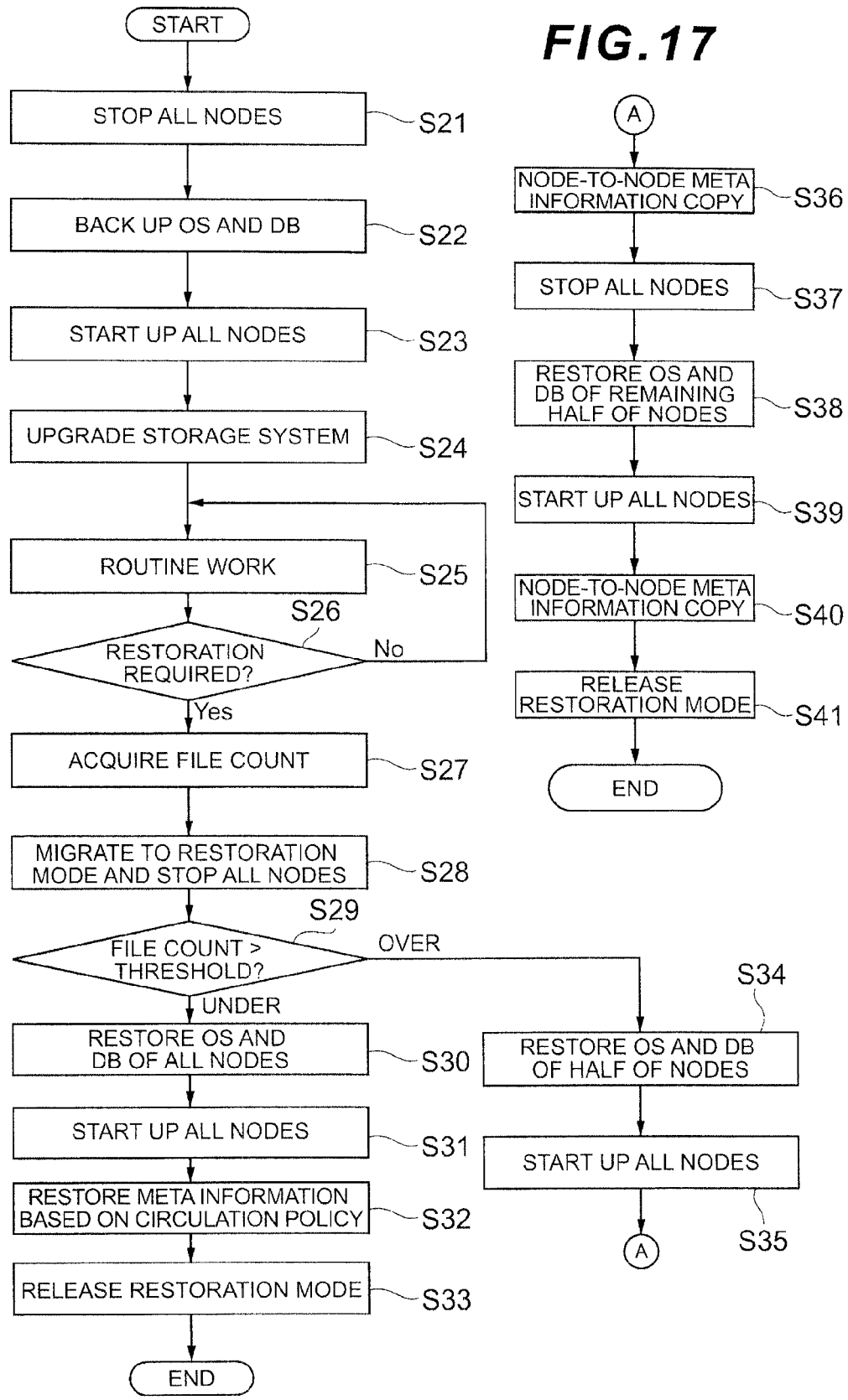
FIG. 17 A flowchart explaining the backup/restoration processing.

The backup/restoration processing is now explained with reference to the flowchart of FIG. 17.

Foremost, the backup server 120 performs stop processing to all nodes 32 to 38 upon performing the backup processing (S21). For example, the backup server 120 refers to the node list table 136, and transfers a command to all nodes 32 to 38 via the LAN switch 140 in order to stop the processing.

In the foregoing case, the backup server 120 may also refer to the node list table 142, select one node among the nodes 32 to 38; for instance, select the node 38, and output a command (shutdown command) to the selected node 38 via the LAN switch 40 for stopping the processing. In the foregoing case, the node 38 refers to the node list table 136, and issues a shutdown command to the other nodes 32, 34, 36.

Subsequently, on the condition that all nodes 32 to 38 have been shut down, the backup server 120 executes the backup processing of the OS and DB to the storage apparatus 44 (S22).

Here, in response to the command from the backup server 120, the control units 64, 66 of the storage apparatus 44 load the OS and DB corresponding to the respective nodes 32 to 38 from the storage units 68, 70, transfers the loaded OS and DB to the backup server 120 via the FC ports 56 to 62 and the FC switch 42, and backs them up to the storage unit 128 of the backup server 120.

After the backup server 120 backs up the OS and DB to the storage unit 128, it stores the versions of the OS and DB corresponding to the nodes 32 to 38 as the original version or the backup version by storing "1.0" and "1.1" in the OS version field 152 and the DB version field 154 of the OS/DB management table 138, respectively. Here, the backup server 120 may automate the backup of the OS and DB corresponding to the respective nodes 32 to 38.

Subsequently, on the condition that the OS and DB have been backed up, the backup server 120 starts the startup processing to all nodes 32 to 38 (S23). Specifically, the backup server 120 issues a startup command to the respective nodes 32 to 38 via the LAN switch 40 and starts up the respective nodes 32 to 38.

Subsequently, the backup server 120 performs upgrade processing to the storage system 30 (S24). Specifically, if it is necessary to upgrade the version of the OS and DB from the original version to the new version, the backup server 120 issues an upgrade command for upgrading the OS and DB to the nodes 32 to 38 via the LAN switch 40 (S24).

Consequently, the respective nodes 32 to 38 performs processing for upgrading the version of the OS and DB corresponding to the respective nodes 32 to 38 from the original version to the new version. Thus, the upgrade of the OS and DB in the respective nodes 32 to 38 can be automated. Here, the backup server 120 stores "2.0" as the value of the new version of the OS in the OS version field 148 of the OS/DB management table 138, and stores "2.2" as the value of the new version of the DB in the DB version field 150 of the OS/DB management table 138.

Subsequently, the respective nodes 32 to 38 and the backup server 120 execute processing concerning their ordinary course of business (S25). For example, the respective nodes 32 to 38 execute processing for making a read access or a write access to the storage units 68, 70 of the storage apparatus 44 according to the OS and DB of the new version. Moreover, the respective nodes 32 to 38 calculate the number of files to be processed, and executes processing for storing [the files] in the storage devices 74, 80, 86, 92 with the calculated value as the file count 160.

Subsequently, during the course of executing processing related to its ordinary course of business, the backup server 120 determines whether restoration is necessary (S26), and continues its ordinary course of business if restoration is not necessary. If restoration is necessary, for instance, if it is necessary to return the version of the OS and DB from the new version to the original version, [the backup server 120] executes processing for acquiring the file count 160 of the respective files (S27).

Specifically, the backup server 120 issues a command to the respective nodes 32 to 38 via the LAN switch 40 for acquiring the file count 160 stored in the storage units 68, 70 of the storage apparatus 44 (S27). Consequently, the respective nodes 32 to 38 acquire the file count 160 from the storage devices 74, 80, 86, 92 corresponding to the respective nodes, and transfers the data concerning the acquired file count 160 to the backup server 120 via the LAN switch 40.

Subsequently, after the backup server 120 acquires the file count 160 of the respective files, it executes processing for switching to the restoration mode and stopping all nodes 32 to 38 (S28).

Specifically, after the backup server 120 acquires the file count 160 concerning the respective nodes 32 to 38, in order to switch to the restoration mode, it issues a command to the respective nodes 32 to 38 via the LAN switch 40 for switching to the restoration mode, and thereafter causes all nodes 32 to 38 to stop their processing (S28).

Here, the respective nodes 32 to 38 issues a command to the control units 64, 66 for switching to the restoration mode, and thereafter stop their operation.

Figure 18:
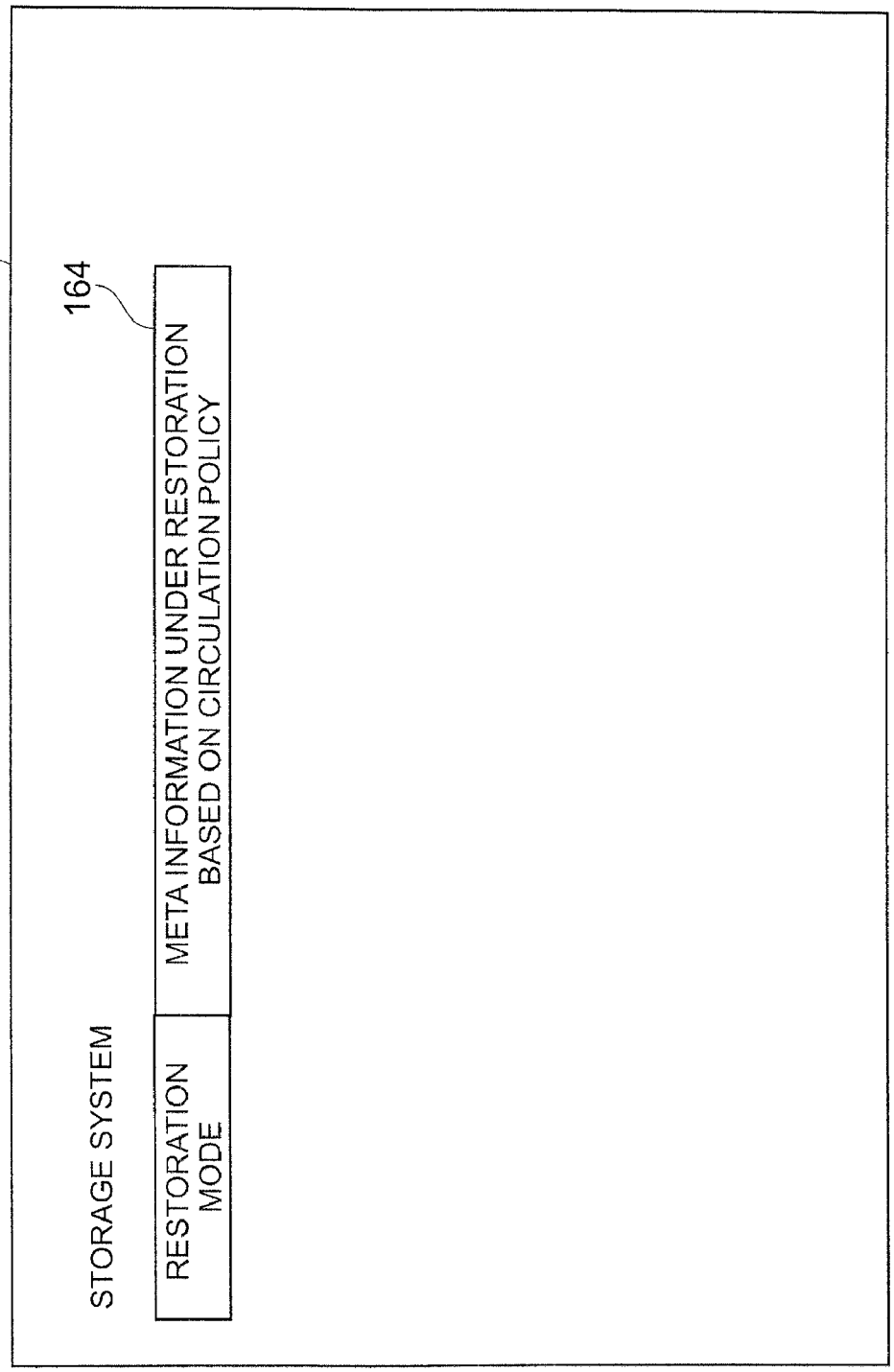
FIG. 18 A diagram showing a display example of a restoration mode display screen of meta information under restoration based on the circulation policy.
Figure 19:
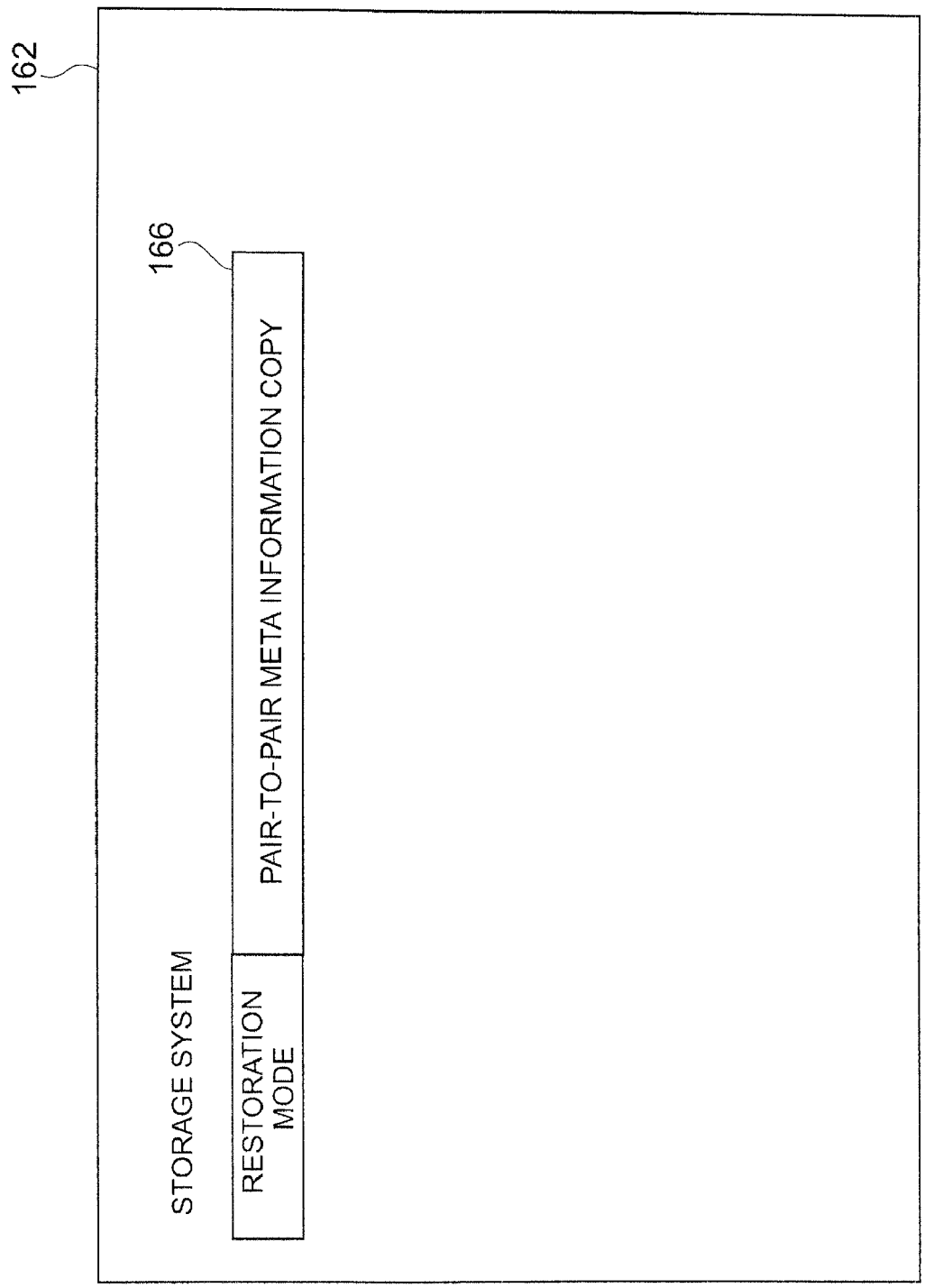
FIG. 19 A diagram showing a display example of a restoration mode display screen of meta information under restoration based on the pair-to-pair meta information copy.

Subsequently, on the condition that all nodes 32 to 38 have been stopped, the backup server 120 determines whether the file count 160 of the respective files has exceeded a threshold. If the file count 160 of the respective files is less than the threshold, as shown in FIG. 18, the backup server 120 displays a message 164 on the restoration mode screen 162 of the display unit (not shown) showing that the mode is the restoration mode and that the meta information is under restoration based on the circulation policy, and proceeds to the processing of step S30. If the file count 160 has exceeded the threshold, as shown in FIG. 19, the backup server 120 displays a message 166 on the restoration mode screen 162 showing that the mode is the restoration mode and that the pair-to-pair meta information copy is being performed, and proceeds to the processing of step S34.

If the file count 160 of the respective files is less than the threshold, at step S30, the backup server 120 performs processing for restoring the OS and DB of all nodes 32 to 38. Specifically, the backup server 120 restores the OS and DB of the original version of all nodes 32 to 38, which were backed up to the storage unit 128, to the storage devices 72, 74, 78, 80, 84, 86, 90, 92 of the storage apparatus 44 via the FC switch 42.

Consequently, the versions of the OS and DB of the storage devices 72, 74, 78, 80, 84, 86, 90, 92 will be returned from the new version to the original version, respectively. Changing of the versions of the OS and DB corresponding to the respective nodes 32 to 38 can thereby be automated.

Subsequently, the backup server 120 issues a startup command to all nodes 32 to 38 via the LAN switch 40, and starts up all nodes 32 to 38 (S31).

Subsequently, the respective nodes 32 to 38 execute the meta information restoration processing (processing of FIG. 20) based on the circulation policy (S32).

The backup server 120 thereafter performs processing for releasing the restoration mode (S33). Specifically, the backup server 120 issues a command for releasing the restoration mode to the respective nodes 32 to 38 via the LAN switch 40, and thereby ends the processing of this routine.

Meanwhile, if the file count 160 of the respective files exceeds the threshold, the meta information restoration processing based on the pair-to-pair meta information copy is executed from step S34 onward, whereby the following will be the preconditions for such processing.

(1) The storage apparatus 44 belonging to the storage system 30 is managed with four nodes 32, 34, 36, 38, the storage units 68, 70 configure a single virtual file system as a single name, and the storage system 30 is configured as a file system that can be accessed as a single directory from the backup server 120.

(2) The meta information stored in the storage devices 74, 80, 86, 92 is redundantly managed with the DB of two or more nodes, and the node pair for redundantly managing the meta information is set in advance.

Foremost, at step S34, the backup server 120 executes restoration processing to half of the nodes. Specifically, the backup server 120 restores the OS and DB of half of the nodes to the storage apparatus 44 via the FC switch 42.

For example, the backup server 120 restores the OS and DB of the original version of half of the nodes 32, 34 among the nodes 32 to 38 to the storage devices 72, 74, 78, 80, and returns the versions of the OS and DB of the storage devices 72, 74, 78, 80 from the new version to the original version, respectively.

Subsequently, the backup server 120 issues a startup command to all nodes 32 to 38 via the LAN switch 40 (S35), and starts up all nodes 32 to 38.

Subsequently, the backup server 120 issues a command to all nodes 32 to 38 via the LAN switch 40 for copying the meta information between the nodes (S36). For example, the node 36 copies the new version meta information to the storage device 74 corresponding to the node 32, and the node 38 copies the new version meta information to the storage device 80 corresponding to the node 34. In the foregoing case, although the OS and DB of the storage devices 74, 80 corresponding to the nodes 32, 34 are respectively original versions, the new version meta information will be stored in the storage devices 74, 80.

Subsequently, the backup server 120 issues a startup stop command to all nodes 32 to 38 via the LAN switch 40, and stops all nodes 32 to 38 (S37).

Subsequently, the backup server 120 starts the restoration processing to the remaining half of the nodes (S38). Specifically, on the condition that the startup of all nodes 32 to 38 has been stopped, the backup server 120 performs processing to the storage apparatus 44 for restoring the OS and DB of the remaining half of the nodes. For example, the backup server 120 restores the OS and DB of the original version of half of the nodes 36, 38 among the nodes 32 to 38 to the storage devices 84, 86, 90, 92, and returns the versions of the OS and DB of the storage devices 84, 86, 90, 92 from the new version to the original version, respectively.

Consequently, even if the real data stored in the storage devices 76, 82, 88, 94 is not updated with the OS and DB of the new version, the OS or DB of the original version will be stored in the storage devices 72, 78, 84, 90 and the storage devices 74, 80, 86, 92, respectively.

Subsequently, the backup server 120 issues a startup command to all nodes 32 to 38 via the LAN switch 40, and starts up all nodes 32 to 38 (S39).

Subsequently, the respective nodes 32 to 38 execute the copy processing of the meta information between the nodes (S40). Specifically, the backup server 120 issues a command for copying the meta information to all nodes 32 to 38 via the LAN switch 40. Consequently, for example, the node 32 will copy the new version meta information to the storage device 86 corresponding to the node 36, and the node 34 will copy the new version meta information to the storage device 92 corresponding to the node 38. Thus, although the OS and DB corresponding to the nodes 36, 38 are the original version, the nodes 36, 38 are able to use the new version meta information.

Subsequently, the backup server 120 performs processing for releasing the restoration mode (S41). Specifically, the backup server 120 issues a command to all nodes 32 to 38 via the LAN switch 40 for releasing the restoration mode, and thereby ends the processing of this routine.

As described above, as a result of executing the meta information restoration processing based on pair-to-pair meta information copy, even if the real data stored in the storage devices 76, 82, 88, 94 is updated with the OS and DB of the new version, the storage devices 72, 78, 84, 90 and the storage devices 74, 80, 86, 92 will respectively store the OS and DB of the original version, but the storage devices 74, 80, 86, 92 will store the new version meta information.

Thus, if the real data stored in the storage devices 76, 82, 88, 94 is updated with the DB and OS of the new version, when comparing the real data and meta information of the respective files in the respective nodes 32 to 38, the new version real data and the new version meta information of the respective files will be compared. Thus, the coincidence in the correspondence relationship of the real data and the meta information of the respective files can be maintained.

Figure 20:
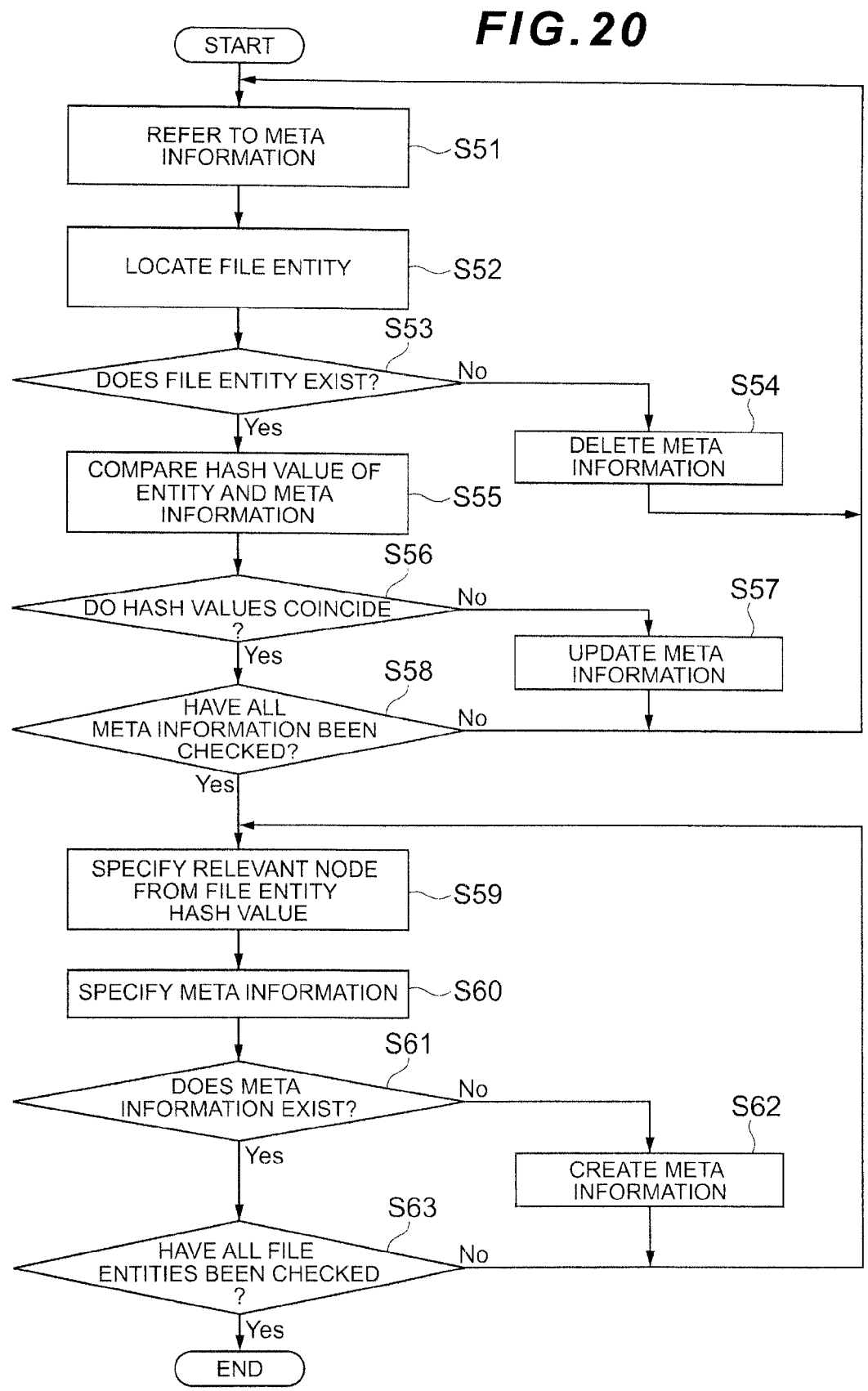
FIG. 20 A flowchart explaining the meta information restoration processing based on the circulation policy.

The meta information restoration processing based on a circulation policy is now explained with reference to the flowchart of FIG. 20. This processing is the specific contents of step S32 shown in FIG. 17, and is executed by the respective nodes 32 to 38.

Foremost, the respective nodes 32 to 38 execute processing for referring to the meta information (S51). Specifically, the respective nodes 32 to 38 respectively refer to the DB of the original version that was restored to the storage devices 74, 80, 86, 92 of the storage units 68, 70 from the backup server 120 as the DB corresponding to the respective nodes 32 to 38, and acquire information such as the file name, file hash value, file storage location and the like as the original version meta information of the respective files.

Subsequently, the respective nodes 32 to 38 execute processing for identifying the storage location of the file entity (S52). Specifically, the respective nodes 32 to 38 perform processing of reading the storage location of the file entity that was added to the meta information of the respective files based on the acquired meta information of the respective files, and identifying the storage location of the file entity.

Subsequently, the respective nodes 32 to 38 determine whether a file entity of the respective files exists (S53). Here, if it is not possible to identify the storage location of the file entity and it is determined that a file entity does not exist, the respective nodes 32 to 38 deem that the real data as the file entity has been deleted, and deletes the meta information of that file (S54), and returns to the processing of step S51.

Meanwhile, at step S53, if it is possible to identify the storage location of the file entity and it is determined that a file entity exists, the respective nodes 32 to 38 perform processing of comparing the hash value obtained from the real data existing in the identified storage location as the file entity of the respective files and the hash value that was added to the meta information acquired from the storage devices 74, 80, 86, 92 (S55).

Specifically, the respective nodes 32 to 38 calculate the hash value of the file based on the file entity (real data) of the file that was updated with the new version, compares the calculated hash value and the hash value that was added to the original version meta information, and determine whether the two hash values coincide (S56). If it is determined that the two hash values do not coincide, the respective nodes 32 to 38 deem that the file has been updated, and perform processing for updating the original version meta information with the calculated hash value (S57), and thereafter returns to the processing of step S51.

Meanwhile, at step S56, if it is determined that the two hash values coincide, the respective nodes 32 to 38 determine whether the meta information of all files has been checked (S58), and return to the processing of step S51 if the meta information of all files has not been checked, and execute processing for identifying the relevant node from the hash value of the file entity if the metal information of all files has been checked (S59).

Specifically, if the meta information of all files has been checked, giving consideration to the face that a file has been added, processing is performed for confirming whether real data of the added file exists in the file entity (real data) that was updated with the OS and DB of the new version.

For example, as the processing of step S59, the respective nodes 32 to 38 calculate the hash value from the directory path of the respective file entities, refers to the hash map table 110 based on the calculated hash value, and identifies the associated node corresponding to the calculated hash value.

Subsequently, the node as the associated node among the nodes 32 to 38 executes processing for confirming the existence of meta information by comparing the file name in the meta information corresponding to the associated node and the file name that was added to the file entity corresponding to the associated node (S60).

Subsequently, the associated node determines whether meta information corresponding to the file name exists based on the comparative result of the file name in the meta information corresponding to the associated node and the file name that was added to the file entity corresponding to the associated node (S61), and if it determines that a file name exists but meta information does not exist, the associated node deems that a file has been newly added and calculates the hash value of the file entity of the added file, creates meta information from the calculated hash value, manages the created meta information as the meta information corresponding to the file entity of the added file with the DB of the original version (S62), and then returns to the processing of step S59.

Meanwhile, at step S61, if it is determined that meta information corresponding to the file name exists, the associated node determines whether all file entities have been checked (S63), and returns to the processing of step S59 if all file entities have not been checked. Meanwhile, if all file entities have been checked, the associated node deems that all meta information and file names obtained from all file entities coincide and that there is no added file, and thereby ends the processing of this routine. In the foregoing case, the meta information restoration processing based on a circulation policy may be automatically executed by the respective nodes 32 to 38.

As described above, with the meta information restoration processing based on a circulation policy, for instance, regarding the file A, if the real data A1 of the file A has been deleted, new meta information A11 cannot be created from the new version real data A1, and if the created meta information A11 and the meta information A11 managed with the DB of the original version do not coincide, it is deemed that the real data A1 as the file entity does not exist, and the original version meta information A11 is deleted.

Consequently, the file A is processed by deeming that a file entity does not exist, it is possible to prevent the occurrence of an inconsistency in the correspondence relationship between the original version meta information A11 and the new version real data A1.

Moreover, with the meta information restoration processing based on a circulation policy, for instance, regarding the file B, if the real data B1 of the file B has been changed pursuant to the change of data and the meta information B11 of the file B has also been changed, the contents of the new version meta information B11 and the original version meta information B11 will not coincide. Thus, the original version meta information B11 is updated with the new version meta information B11.

Consequently, regarding the file B, even if the OS and DB are the original version, the contents of the meta information B11 will be the meta information B11 managed with the DB of the new version, and the file entity will be the new version real data B1. Thus, it is possible to prevent the occurrence of an inconsistency in the correspondence relationship between the original version meta information B11 and the new version real data B1.

Moreover, with the meta information restoration processing based on a circulation policy, for example, regarding an added file, meta information is created based on the real data of the added file.

Consequently, regarding the added file, even if the OS and DB are the original version, the meta information will be the new version meta information, and the file entity will be the new version real data. Thus, it is possible to prevent the occurrence of an inconsistency in the correspondence relationship between the original version meta information and the new version real data.

The meta information restoration processing based on pair-to-pair meta information copy is now explained with reference to the flowchart of FIG. 21. This processing is processing that is executed upon performing the meta information restoration processing based on pair-to-pair meta information copy using the pair node table 140. Here, the following matters will be the precondition in performing the meta information restoration processing based on pair-to-pair meta information copy.

(1) The storage apparatus 44 belonging to the storage system 30 is managed and configured with four nodes 32, 34, 36, 38, the storage units 68, 70 configure a single virtual file system as a single name, and the storage system 30 is configured as a file system that can be accessed from the backup server 120 as a single directory.

(2) The meta information stored in the storage devices 74, 80, 86, 92 is managed redundantly in databases of two or more nodes, and the node pair for redundantly managing the meta information is set in advance in the pair node table 140.

Foremost, the backup server 120 executes pair node check processing via the LAN switch 40 (S71). Specifically, the backup server 120 issues a command to all nodes 32 to 38 via the LAN switch 40 for acquiring information of the pair node table 140 corresponding to the respective nodes 32 to 38, acquires information concerning the pair node table 140 corresponding to the respective nodes 32 to 38 from the respective nodes 32 to 38, and checks the relationship between the respective nodes 32 to 38 and the pair node regarding the respective nodes 32 to 38.

Subsequently, the backup server 120 executes the restoration processing of restoring the OS and DB to the pair node 1 to all nodes 32 to 38 via the LAN switch 40 (S72). Specifically, the backup server 120 designates the node 32 and the node 36 as the nodes corresponding to the "pair node 1," and restores the OS and DB of the original version stored in the OS/DB management table 138 to the node 32 and the node 36. Consequently, the OS of the original version will be stored in the storage device 72 of the storage unit 68 and the storage device 84 of the storage unit 70, and the DB of the original version will be stored in the storage device 74 of the storage unit 68 and the storage device 86 of the storage unit 70.

Subsequently, the backup server 120 issues a command to all nodes 32 to 38 via the LAN switch 40 for starting up all nodes 32 to 38 (S73).

Subsequently, the backup server 120 issues a command to all nodes 32 to 38 via the LAN switch 40 for copying meta information between the pair node (S74). For example, the backup server 120 issues a command to all nodes 32 to 38 for copying all meta information from the nodes 34, 38 belonging to the "pair node 2" to the nodes 32, 36 belonging to the "pair node 1."

Here, the nodes 34, 38 belonging to the "pair node 2" copy the meta information based on a plurality of new versions respectively managed by the nodes 34, 38 to the nodes 32, 36 belonging to the "pair node 1." Consequently, meta information based on a plurality of new versions will be stored in the storage device 74 and the storage device 86 storing the DB of the original version.

Subsequently, the backup server 120 issues a command to all nodes 32 to 38 via the LAN switch 40 for stopping the startup of the nodes 32 to 38 (S75).

Subsequently, after the startup of the nodes 32 to 38 has been stopped, the backup server 120 executes the restoration processing of restoring the OS and DB to the pair node 2 (S76). For example, the backup server 120 restores the backup OS and DB of the OS/DB management table 138 corresponding to the nodes 34, 38 belonging to the "pair node 2" to the storage units 68, 70 of the storage apparatus 44 via the FC switch 42. Specifically, the backup server 120 executes processing of storing the OS of the original version in the storage devices 78, 90 and storing the DB of the original version in the storage devices 80, 92 as the OS and DB corresponding to the nodes 34, 38.

Subsequently, the backup server 120 issues a startup command to all nodes 32 to 38 via the LAN switch 40, and starts up all nodes 32 to 38 (S77).

The respective nodes 32 to 38 thereafter execute the meta information copy processing between the pair nodes (S78). For example, the backup server 120 issues a command to all nodes 32 to 38 via the LAN switch 40 for copying all meta information from the "pair node 1" to the "pair node 2." Here, the nodes 32, 36 copy all meta information based on a plurality of new versions stored in the storage devices 74, 86 to the storage devices 80, 92 corresponding to the nodes 34, 38, and thereby end the processing of this routine.

Based on the foregoing processing, in cases where the real data of the storage devices 76, 82, 88, 94 corresponding to all nodes 32 to 38 has been updated with the OS and DB of the new version, and the version of the OS and DB has been changed from the new version to the original version, the nodes 32 to 38 are able to manage the real data in the storage devices 76, 82, 88, 94 with the new version meta information.

Thus, if the real data stored in the storage devices 76, 82, 88, 94 is updated with the DB and OS of the new version, and the real data and meta information of the respective files are compared in the respective nodes 32 to 38, the new version real data and the new version meta information of the respective files will be compared, and it is thereby possible to maintain the consistency in the correspondence relationship of the two.

According to the present embodiment, when returning the version of the OS and DB of a plurality of files from the new version to the original version, meta information restoration processing based on a circulation policy is selected as the first processing if the file count of the plurality of files is less than a threshold, and meta information restoration processing based on pair-to-pair meta information copy is selected as the second processing if the file count of a plurality of files exceeds a threshold. Thus, either processing can be selected according to the file count of a plurality of files, and, if the first processing is selected, processing can be performed faster in comparison to cases of selecting the second processing.

Moreover, according to the present embodiment, when returning the version of the OS and DB of a plurality of files from the new version to the original version, by executing the meta information restoration processing based on a circulation policy, for instance, regarding the deleted file A, the meta information A11 of that file A is deleted, regarding the file B in which was the real data was updated, the meta information B11 is updated according to the updated real data B1, and regarding the added file D, the meta information is created based on the real data of the added file D. Consequently, the consistency in the correspondence relationship between the original version meta information and the new version real data of the respective files A, B, D can be maintained.

In addition, according to the present embodiment, when returning the version of the OS and DB of a plurality of files from the new version to the original version, if the real data stored in the storage devices 76, 82, 88, 94 is updated with the DB and OS of the new version and the real data and the meta information of the respective files are compared in the respective nodes 32 to 38, the new version real data and the new version meta information of the respective files will be compared. Thus, the consistency in the correspondence relationship between the two can be maintained.

REFERENCE SIGNS LIST

10 Storage system
12 Data area
14 Database area
16 OS area
18 Backup system
32, 34, 36, 38 Node
40 LAN switch
42 FC switch
44 Storage apparatus
50 Processor
64, 66 Control unit
68, 70 Storage unit
72 to 94 Storage device
98 Client
120 Backup server

The invention claimed is:
1. A storage system, comprising:
a memory device including a plurality of data areas for storing data of a plurality of files, a plurality of database areas for storing a database including meta information of each of the files, and a plurality of operating system areas for storing an operating system;
a host coupled to the memory device via a network for processing data stored in the plurality of data areas as real data according to the operating system and managing meta information stored in the plurality of database areas according the database; and
a backup server coupled to the memory device and the host via the network for managing a version of the operating system and the database, commanding the host to perform processing associated with changes to the version of the operating system and the database, and backing up the operating system and the database with a pre-change version as an original version upon changing the version of the operating system and the database,
wherein the plurality of database areas includes a pair, the pair including a first database area and a second database area, in the first database area and the second database area, the meta information of each of the files being managed redundantly,
wherein, when the version of the operating system and the database is changed to a new version and is to be subsequently returned to the original version, the backup server selects, as one processing, processing based on pair-to-pair meta information copy,
wherein, when the backup server selects the processing based on the pair-to-pair meta information copy as the one processing, the backup server restores the original version of the operating system and the database to the first database area and issues a command to the host to copy the new version of the meta information, and the host copies the new version of the meta information to the first database area from the second database area, and
wherein the backup server restores the original version of the operating system and the database to the second database area and issues a command to the host to copy of the new version of the meta information, and the host copies the new version of the meta information to the second database area from the first database area.
2. The storage system according to claim 1,
wherein, as the one processing according to a command from the backup server, the host selects processing based on the pair-to-pair meta information copy or processing based on a circulation policy in substitute for the processing based on the pair-to-pair meta information copy,
wherein, in the processing based on the circulation policy when the host compares the original version meta information and the new version real data with meta information of each of the files managed with the database of the original version as the original version meta information and real data of each of the files processed according to the operating system and the database of the new version as the new version real data,
if the host obtains a comparative result to the effect that there is inconsistency between the original version meta information and the new version real data since the original version meta information exists but the new version real data does not exist, the host deletes the inconsistent original version meta information, if the host obtains a comparative result to the effect that there is discrepancy in the contents of the original version meta information and the new version real data and there is inconsistency between the original version meta information and the new version real data, the host updates the inconsistent original version meta information with the inconsistent new version real data, if the host obtains a comparative result to the effect that there is inconsistency between the original version meta information and the new version real data since the new version real data exists but the original version meta information does not exist, the host creates meta information based on the new version real data in which the meta information does not exist, and uses the created meta information as the original version meta information in which the meta information does not exist, wherein, in the processing based on the pair-to-pair meta information copy, on the condition that the database area is managed by being divided into a plurality of database areas and meta information managed with the database of the new version is distributed and stored in each of the database areas as meta information of the new version, the host loads the operating system and the database of the original version from the backup server to the second database area among the plurality of database areas, and changes the version of the operating system and the database from the new version to the original version, wherein the host thereafter copies meta information of the new version stored in first database area among the plurality of database areas to the second database area, wherein the host thereafter loads the operating system and the database of the original version from the backup server to the first database area, and changes the version of the operating system and the database from the new version to the original version, and wherein the host thereafter copies meta information of the new version existing in the second database area to the first database area.

3. The storage system according to claim 1, wherein, when the host selects processing based on a circulation policy as the one processing according to a command from the backup server, on the condition that the version of the operating system and the database has been changed from the new version to the original version, the host compares the meta information of each of the files managed with the database of the original version and real data of each of the files processed according to the operating system and the database of the new version, and restores the meta information of each of the files managed with the database of the original version based on the comparative result.

4. The storage system according to claim 3, wherein, in the processing based on a circulation policy when the host compares the original version meta information and the new version real data with meta information of each of the files managed with the database of the original version as the original version meta information and real data of each of the files processed according to the operating system and the database of the new version as the new version real data, if the host obtains a comparative result to the effect that there is inconsistency between the original version meta information and the new version real data since the original version meta information exists but the new version real data does not exist, the host deletes the inconsistent original version meta information.

5. The storage system according to claim 3, wherein, in the processing based on a circulation policy when the host compares the original version meta information and the new version real data with meta information of each of the files managed with the database of the original version as the original version meta information and real data of each of the files processed according to the operating system and the database of the new version as the new version real data, if the host obtains a comparative result to the effect that there is discrepancy in the contents of the original version meta information and the new version real data and there is inconsistency between the original version meta information and the new version real data, the host updates the inconsistent original version meta information with the inconsistent new version real data.

6. The storage system according to claim 3, wherein, in the processing based on a circulation policy when the host compares the original version meta information and the new version real data with meta information of each of the files managed with the database of the original version as the original version meta information and real data of each of the files processed according to the operating system and the database of the new version as the new version real data, if the host obtains a comparative result to the effect that there is inconsistency between the original version meta information and the new version real data since the new version real data exists but the original version meta information does not exist, the host creates meta information based on the new version real data in which the meta information does not exist, and uses the created meta information as the original version meta information in which the meta information does not exist.

7. The storage system according to claim 3, wherein, when the host is to change the version of the operating system and the database to the original version, the host acquires the number of files stored in the memory device, selects the processing based on a circulation policy if the acquired number of files is smaller than a threshold, and selects the processing based on the pair-to-pair meta information copy if the acquired number of files exceeds a threshold.

8. The storage system according to claim 1, wherein the memory device includes a plurality of data areas as the data area and a plurality of database areas as the database area, wherein the host is configured from a plurality of nodes arranged in correspondence with the plurality of data areas and the plurality of database areas for processing data stored in each of the data areas as real data according to the operating system, wherein the plurality of database areas and the plurality of nodes are respectively divided into one group and another group, and a database area belonging to the one group stores meta information of a processing-target file of a node belonging to the other group, and a database area belonging to the other group stores meta information of a processing-target file of a node belonging to the one group, wherein, in the processing based on the pair-to-pair meta information copy performed by the host, the node belonging to each of the groups distributes and stores meta information managed with the database of the new version in a database area belonging to each of the groups as meta information of the new version, the node belonging to the one group thereafter loads the operating system and the database of the original version from the backup server to a database area belonging to the one group, and changes the version of the operating system and the database from the new version to the original version, the node belonging to the other group thereafter copies meta information of the new version stored in a database area belonging to the other group to a database area belonging to the one group, the node belonging to the other group thereafter loads the operating system and the database of the original version from the backup server to a database area belonging to the other group, and changes the version of the operating system and the database from the new version to the original version, and the node belonging to the one group thereafter copies meta information of the new version existing in a database area belonging to the one group to a database area belonging to the other group.

9. A method of managing files in a storage system, the storage system comprising a memory device including a plurality of data areas, a plurality of database areas, and a plurality of operating system areas, a host coupled to the memory device, and a backup server coupled to the memory device and the host via the network, the method comprising:

storing, in the plurality of data areas, data of a plurality of files, storing, in the plurality of database areas, meta information of each of the files, and storing, in the plurality of operating system areas, an operating system;

processing, by the host, data stored in the plurality of data areas as real data according to the operating system, and managing, by the host, meta information stored in the plurality of database area according the database; and managing, by the backup server, a version of the operating system and the database, commanding, by the backup server, the host to perform processing associated with changes to the version of the operating system and the database, and backing up, by the backup server, the operating system and database with a pre-change version as an original version upon changing the version of the operating system and the database, wherein the plurality of database areas includes a pair, the pair including a first database area and a second database area, in the first database area and the second database area, the meta information of each of the files being managed redundantly, wherein the host is configured from a plurality of nodes arranged in correspondence with the plurality of data areas and the plurality of database areas for processing data stored in each of the data areas as real data according to the operating system, wherein the plurality of database areas and the plurality of nodes are respectively divided into one group and another group, and a database area belonging to the one group stores meta information of a processing-target file of a node belonging to the other group, and a database area belonging to the other group stores meta information of a processing-target file of a node belonging to the one group, wherein, when the version of the operating system and the database is changed to a new version and is to be subsequently returned to the original version, the backup server selects one processing, and wherein, when the backup server selects the processing based on pair-to-pair meta information copy as the once processing, the backup server restores the original version of the operating system and the database to the first database area and issues a command to the host to copy the new version of the meta information, and the host copies the new version of the meta information to the first database area from the second database area, and wherein the backup server restores the original version of the operating system and the database to the second database area and issues a command to the host to copy of the new version of the meta information, and the host copies the new version of the meta information to the second database area from the first database area.

10. The method of managing files in a storage system according to claim 9, wherein, when the host selects processing based on a circulation policy as the one processing according to a command from the backup server, on the condition that the version of the operating system and the database has been changed from the new version to the original version, the host executes comparison processing of comparing the meta information of each of the files managed with the database of the original version and real data of each of the files processed according to the operating system and the database of the new version, and restoration processing of restoring the meta information of each of the files managed with the DB of the original version based on the comparative result.

11. The method of managing files in a storage system according to claim 10, wherein, in the comparison processing of the processing based on a circulation policy when the host compares the original version meta information and the new version real data with meta information of each of the files managed with the database of the original version as the original version meta information and real data of each of the files processed according to the operating system and the database of the new version as the new version real data, if the host obtains a comparative result to the effect that there is inconsistency between the original version meta information and the new version real data since the original version meta information exists but the new version real data does not exist, the host executes deletion processing of deleting the inconsistent original version meta information.

12. The method of managing files in a storage system according to claim 10, wherein, in the comparison processing of the processing based on a circulation policy when the host compares the original version meta information and the new version real data with meta information of each of the files managed with the database of the original version as the original version meta information and real data of each of the files processed according to the operating system and the database of the new version as the new version real data, if the host obtains a comparative result to the effect that there is discrepancy in the contents of the original version meta, information and the new version real data and there is inconsistency between the original version meta information and the new version real data, the host executes update processing of updating the inconsistent original version meta information with the inconsistent new version real data.

13. The method of managing files in a storage system according to claim 10, wherein, in the comparison processing of the processing based on a circulation policy when the host compares the original version meta information and the new version real data with meta information of each of the files managed with the database of the original version as the original version meta information and real data of each of the files processed according to the operating system and the database of the new version as the new version real data, if the host obtains a comparative result to the effect that there is inconsistency between the original version meta information and the new version real data since the new version real data exists but the original version meta information does not exist, the host executes creation processing of creating meta information based on the new version real data in which the meta information does not exist, and executes storage processing of storing the meta information created at the creation step as the original version meta information in which the meta information does not exist.

14. The method of managing files in a storage system according to claim 10,
wherein, when the host is to change the version of the operating system and the database to the original version, the host acquires the number of files stored in the memory device, selects the processing based on a circulation policy if the acquired number of files is smaller than a threshold, and selects the processing based on the pair-to-pair meta information copy if the acquired number of files exceeds a threshold.

15. The method of managing files in a storage system according to claim 9,
wherein the memory device includes a plurality of data areas as the data area and a plurality of database areas as the database area,
wherein the host is configured from a plurality of nodes arranged in correspondence with the plurality of data areas and the plurality of database areas for processing data stored in each of the data areas as real data according to the operating system,
wherein the plurality of database areas and the plurality of nodes are respectively divided into one group and another group, and a database area belonging to the one group stores meta information of a processing-target file of a node belonging to the other group, and a database area belonging to the other group stores meta information of a processing-target file of a node belonging to the one group,
wherein, in the processing based on the pair-to-pair meta information copy performed by the host,
the node belonging to each of the groups executes storage processing of distributing and storing meta information managed with the DB of the new version in a database area belonging to each of the groups as meta information of the new version,
the node belonging to the one group thereafter executes first version change processing of loading the operating system and the database of the original version from the backup server to a database area belonging to the one group, and changing the version of the operating system and the database from the new version to the original version,
the node belonging to the other group thereafter executes first copy processing of copying meta information of the new version stored in a database area belonging to the other group to a database area belonging to the one group,
the node belonging to the other group thereafter executes second version change processing of loading the operating system and the database of the original version from the backup server to a database area belonging to the other group, and changing the version of the operating system and the database from the new version to the original version, and
the node belonging to the one group thereafter executes second copy processing of copying meta information of the new version existing in a database area belonging to the one group to a database area belonging to the other group.

* * * * *